US012742994B2

(12) United States Patent
Yen et al.

(10) Patent No.: US 12,742,994 B2
(45) Date of Patent: Sep. 22, 2026

(54) OPTICAL DEVICE AND METHOD OF FABRICATING THEREOF

(71) Applicant: Taiwan Semiconductor Manufacturing Company, Ltd., Hsinchu (TW)

(72) Inventors: Tzu-Hsiang Yen, Hsinchu (TW); Yung-Jr Hung, Hsinchu (TW); Tai-Chun Huang, New Taipei City (TW)

(73) Assignee: TAIWAN SEMICONDUCTOR MANUFACTURING COMPANY, LTD., Hsinchu (TW)

(*) Notice: Subject to any disclaimer, the term of this patent is extended or adjusted under 35 U.S.C. 154(b) by 281 days.

(21) Appl. No.: 18/166,016

(22) Filed: Feb. 8, 2023

(65) Prior Publication Data

US 2024/0061308 A1 Feb. 22, 2024

Related U.S. Application Data

(60) Provisional application No. 63/371,529, filed on Aug. 16, 2022.

(51) Int. Cl.

*G02F 1/225* (2006.01)
*G02F 1/01* (2006.01)
*G02F 1/21* (2006.01)

(52) U.S. Cl.

CPC ............ *G02F 1/225* (2013.01); *G02F 1/0147* (2013.01); *G02F 1/212* (2021.01)

(58) Field of Classification Search

CPC ................................ G02F 1/225; G02F 1/212

See application file for complete search history.

(56) References Cited

U.S. PATENT DOCUMENTS 8,369,666 B2 2/2013 Kamei
9,257,814 B1 * 2/2016 Djordjevic .............. H01S 5/142
9,684,222 B2 6/2017 Lee
2009/0148115 A1 6/2009 Lee
2016/0070062 A1 3/2016 Lipson
2016/0299292 A1 * 10/2016 Hassan .................. G02B 6/136
2019/0317278 A1 10/2019 Kobayashi (Continued)

OTHER PUBLICATIONS

Djordjevic, Stevan S., et al. "CMOS-compatible, arthermal silicon ring modulators clad with titanium dioxide." Optics Express, vol. 21, No. 12, Jun. 2013, 11pp.

(Continued)

*Primary Examiner* — Chad H Smith
(74) *Attorney, Agent, or Firm* — HAYNES AND BOONE, LLP

(57) ABSTRACT

Optical devices and methods of fabricating thereof that include providing two different optical paths: a first optical path including a first waveguide core and a first cladding layer adjacent the first waveguide core; and a second optical path including a second waveguide core and a second cladding layer adjacent the second waveguide core. A thermo-optic coefficient (TOC) of the first waveguide core and a TOC of the first cladding layer have a same sign, for example positive, and a sign of a TOC of the second waveguide core is different than a sign of a TOC of the second cladding layer, for example, one positive and one negative. The paths may be in an Mach-Zehnder Interferometer (MZI).

20 Claims, 22 Drawing Sheets

(56) References Cited

U.S. PATENT DOCUMENTS

2022/0082876 A1* 3/2022 Sugiyama ............... G02F 1/035
2022/0137295 A1* 5/2022 Grillanda ........... G02B 6/12028
385/131

OTHER PUBLICATIONS

Horst, Folkert et al., "Cascade Mach-Zehnder wavelength filters in silicon photonics for low loss and flat pass-band WDM (de-)multiplexing." Optics Express, vol. 21, No. 1, May 2013, 7pp.
Lin, Baizhu et al., "A Polymer Asymmetric Mach-Zehnder Interferometer Sensor Model Based on Electrode Thermal Writing Waveguide Technology." Micromachines, Sep. 2019, 11 pp.

* cited by examiner

Y1
Y
316t
314
314
314
314
314
314
700C
700B
316b
312
310

300'''
A
A'
316
312
310
306
314t'
314t'

OPTICAL DEVICE AND METHOD OF FABRICATING THEREOF

PRIORITY

This application claims the benefits of U.S. Prov. App. Ser. No. 63/371,529, filed Aug. 16, 2022, the entire disclosures of which are incorporated herein by reference.

BACKGROUND

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. Therefore, implementation and operation of optical data communication systems is dependent upon having reliable and efficient mechanisms for transmitting laser light and detecting laser light at different nodes within the optical data network. In this regard, it can be necessary to convert data streams from an electrical domain to an optical domain, and vice-versa, and transmit data streams between various physically distributed computing systems.

In some implementations, wavelength division multiplexing (WDM) can communicate modulated data streams at different carrier wavelengths on a common optical waveguide. WDM can overcome traditional optical-fiber congestion, which is a potential problem in optical modules that include parallel optical transceivers with one channel per optical fiber. In particular, by significantly reducing the number of optical fibers per optical module, WDM can simplify optical modules, thereby reducing their cost and size. Further, the capability of employing WDM technology on semiconductor devices (e.g., integrated circuits) using semiconductor device fabrication techniques can enable lower power consumption and assembly costs. However, implementation of semiconductor device photonics techniques raises challenges due to sensitivity of fabricating small components. Variations in components as-fabricated can lead to challenges in providing and maintaining different carrier wavelengths. Thus, while current methods have been suitable in some respects, improved devices and method of fabricating thereof continue to be desired.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only except explicitly disclosed. In fact, the dimensions of the various features may be arbitrarily increased or reduced for clarity of discussion.

DETAILED DESCRIPTION

Figure 1:
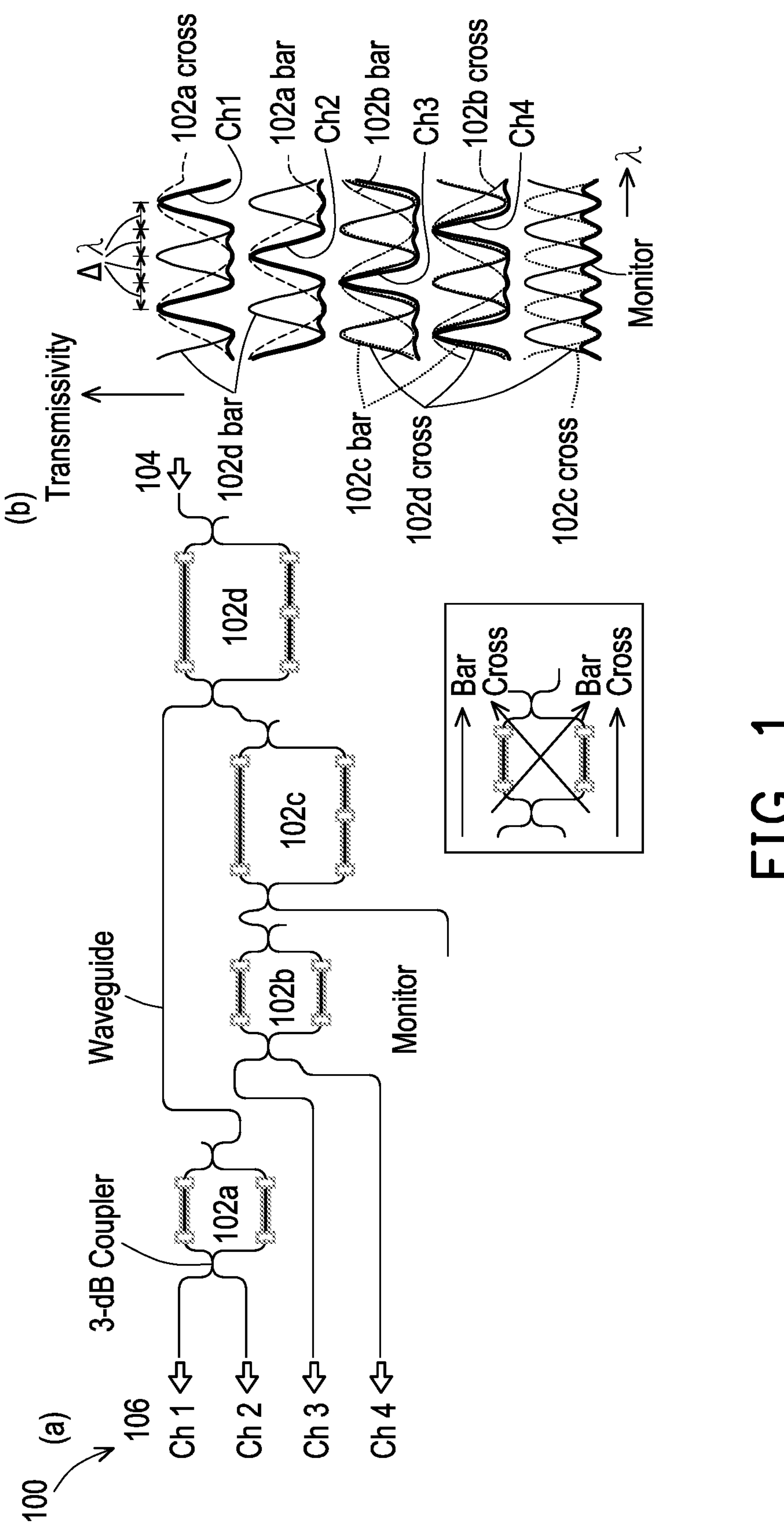
FIG. 1 illustrates a diagram of a photonic circuit providing a demultiplexer device, according to various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Further, when a number or a range of numbers is described with "about," "approximate," and the like, the term is intended to encompass numbers that are within a reasonable range considering variations that inherently arise during manufacturing as understood by one of ordinary skill in the art. For example, the number or range of numbers encompasses a reasonable range including the number described, such as within +/−10% of the number described, based on known manufacturing tolerances associated with manufacturing a feature having a characteristic associated with the number. For example, a material layer having a thickness of "about 5 nm" can encompass a dimension range from 4.5 nm to 5.5 nm where manufacturing tolerances associated with depositing the material layer are known to be +/−10% by one of ordinary skill in the art.

In some implementations of the present disclosure, the devices and methods are applied to WDM applications. WDM filters can be made by interferometers, one type of these interferometer-based optical filters is Mach-Zehnder Interferometers (MZIs). The MZI provides an optical component that is based on two-beam interference. The exemplary embodiments of photonic devices providing MZI with waveguide configurations engineered to tune the wavelengths output by the photonic device are discussed herein. Employing such devices, MZI based devices for WDM applications, as integrated circuit based photonic circuits provides benefits as discussed above.

However, these devices also may exhibit high refractive index contrasts and small feature sizes making the devices very sensitive to small nanoscale variations in their geometry that may be induced by semiconductor fabrication and/or patterning techniques. For example, differences in pattern density defined on a device can lead to variations in the ability to accurately reproduce the desired patterns. In some implementations, the variations (e.g., from process, design, patterning, etc.) affect the effective index of the waveguide of the device, which in turn changes a phase delay between two arms of an MZI of an interometric filter circuit leading to a shift in the desired filter response. The discussion below illustrates compensation techniques employed to limit and/or avoid these undesired shifts.

The present disclosure is not limited to the explicitly illustrated devices and/or these particular challenges. Various optical communication systems or network technologies use both optical components and electronic circuits, and may implement the exemplary embodiments of the photonic devices for performance improvement. For example, the exemplary photonic circuitry implemented in various optical communication systems, such as in antennas and other photonics-based field applications.

As a brief overview of an example of the relevant technology, an MZI component comprises waveguides for guiding light. In particular, waveguide wire (e.g., silicon wire) with cladding surrounding the wire forms the waveguide. Herein the cladding is referred to as lower or under cladding, that material extending under the wire and upper cladding, that material extending over the wire. When forming an MZI on-chip, waveguides are formed to provide two paths for light to travel through the component, these paths are referred to as "arms" in the discussion below. In some implementations, one arm is a reference arm while the other arm is a sensing or manipulated arm. It is noted that the "arms" of the MZI components illustrated in the accompanying figures are not limited to this shape unless specifically recited in the claims that follow.

MZI and waveguides in general are defined by various parameters. A refractive index (n) includes a ratio of the speed of light in vacuum and the speed of light in a given bulk media for a given wavelength. Generally, the refractive index of a material is dependent upon a wavelength and temperature. An effective index ($n_{eff}$) considers the light propagating in the component (rather than the bulk medium of the refractive index). A group index (ng) can be used to determine the free-spectral range (FSR), which can be conceptualized as a shift in effective index versus a wavelength. The FSR for a MZI depends on a difference in the length (ΔL) of the arms of the MZI and the group index of the waveguide. In an embodiment, the length of the arms may be the linear optical distance traveled within the arm.

As but one device that may benefit from aspects of the present disclosure, a demultliplexer device (DMX) 100 is illustrated in a schematic form in FIG. 1. In an embodiment, the DMX 100 can be fabricated on a semiconductor device such as in forming a silicon photonic integrated circuit (PIC). The DMX 100 includes four Mach-Zehnder interferometers (MZI) 102*a*, 102*b*, 102*c*, 102*d*. The MZI 102 are cascaded. In an embodiment, the MZI 102*a* and 102*b* each have an arm length difference of ΔL and MZI 102*c* and 102*d* each have an arm length difference of 2ΔL. The input light is provided at input 104, and the output region 106 includes channels/ports Ch 1, Ch 2, Ch 3, Ch 4 respectively. A different wavelength may be output at each channel/port. At (b) of FIG. 1, a transmissivity spectrum is provided corresponding to an implementation of the circuit 100. In an embodiment, the transmissivity spectra of each MZI is a raised-cosine function with a period of 2Δλ or Δλ.

It is recognized that a refractive index of an optical material is not a constant parameter over all temperatures; the variation of the refractive index with temperature is referred to as a "thermo-optic coefficient" (TOC). That is, a TOC quantifies a value of the thermal effect on optical materials. The relatively large TOC of silicon means that the temperature drift can induce significant changes of the refractive index of the silicon wire or core when used to provide a waveguide. In fact, silicon has one of the highest TOC among thermo-optical materials; the TOC of silicon is approximately 1.86×10-4 per Kelvin. Thus, MZI 102*a*-102*d* of the device 100, which may be formed of silicon core waveguides, are sensitive to temperature changes. The temperature changes can thus affect the spectral response if not addressed.

In some implementations, a heater structure can be arranged over each arm of the MZIs 102*a*-102*d* to generate and apply heat. This heat can induce a change in temperature of the waveguide, which in turns changes the refractive index, carrier mobility and/or other characteristics. Thus, heaters can be used to shift the velocity and/or phase of the light traveling through the respective component. The use of heaters however increases the power consumption of devices and/or the assembly costs of said devices (e.g., optical transceivers) are increased.

The present disclosure provides implementations and embodiments that may be fabricated without the use of heaters to compensate for temperature modifications or process shifts. In other words, in some implementations, the MZI 102*a*-102*d* are fabricated without a heater component. The MZI 102*a*-102*d* may be formed using the methods and structures discussed below such that each MZI is configured to compensate for process and thermal variations. The configuration includes determining parameters of the MZI such as the arm length and width, and the relative TOC of the components (e.g., upper cladding and core). In some implementations, the upper cladding components to core component materials are selected to provide TOC that cancel out their affects, thereby allowing for a compensation of process/temperature for the region of the component such that there is no undesired wavelength shift. In doing so, the output of illustrated in transmissivity spectra (b) is provided by engineering the MZI 102a-102d to operate in athermal composition as a heater is not required. Similarly, a controller (not shown) to monitor the heaters is also not required.

Figure 2:
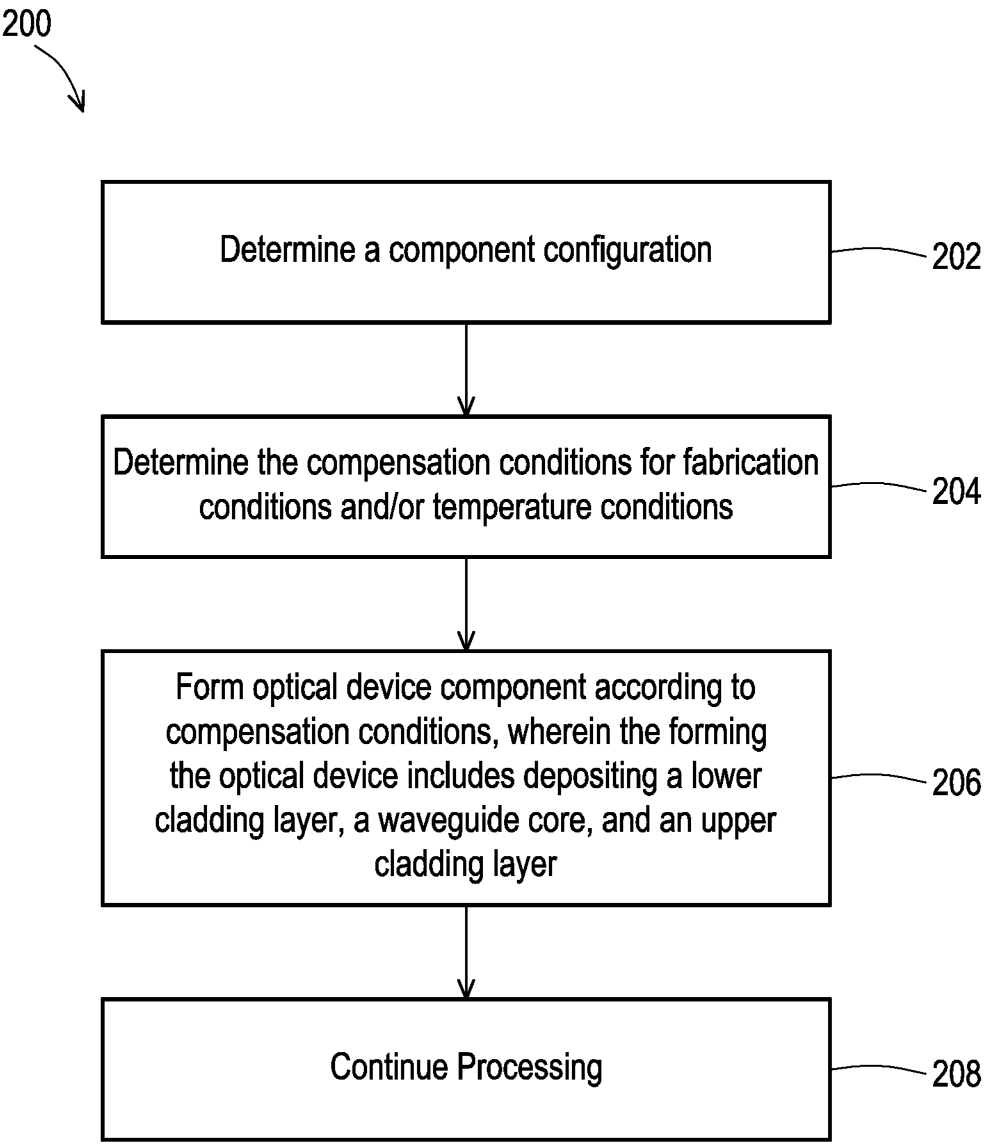
FIG. 2 illustrates a method of fabricating a photonic device according to an embodiment of the present disclosure.

Referring now to FIG. 2, illustrated in a method 200 for designing and fabricating an optical device. Method 200 is merely an example and is not intended to limit the present disclosure to what is explicitly illustrated in method 200. Additional steps may be provided before, during and after method 200, and some steps described can be replaced, eliminated, or moved around for additional embodiments of the methods. Not all steps are described herein in detail for reasons of simplicity. The method 200 allows for engineering or tuning a waveguide component to provide a dispersion of the output wavelength(s) in a fabrication-insensitive manner. The method 200 allows for engineering or tuning a waveguide component to provide a dispersion of the output wavelength(s) in an athermal operation. The tuning includes engineering a waveguide includes selecting upper cladding materials, core materials, and defining dimensions of the component including the core and upper cladding.

Figure 3:
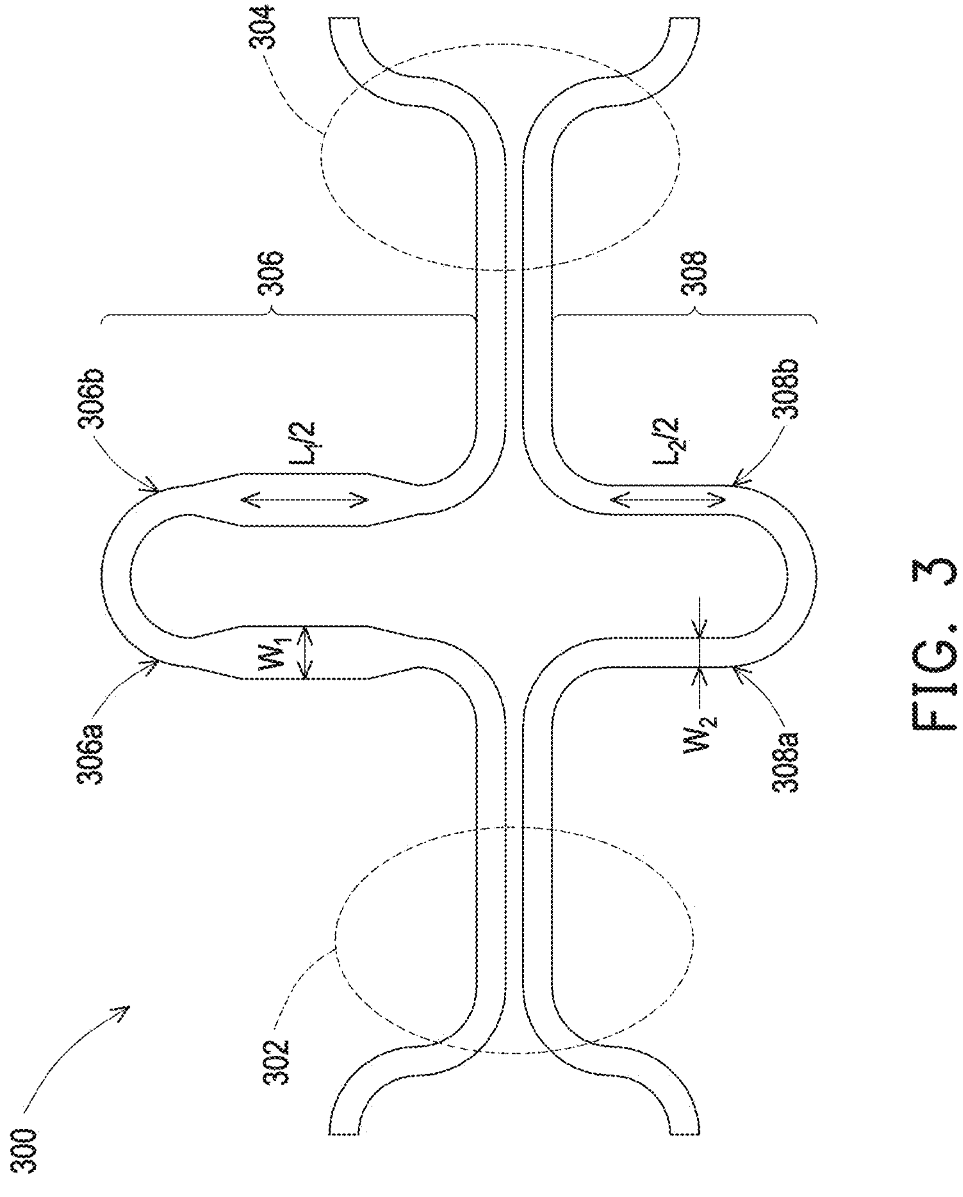
FIG. 3 shows a diagram of a Mach-Zehnder Interferometer (MZI), according to an embodiment of the present disclosure.

The method 200 begins at block 202 where a component configuration is determined. In an embodiment, the component configuration is an MZI. FIG. 3 is a schematic illustrative of an embodiment of an MZI 300. In an embodiment, the MZI 300 may be one component of an optical device including multiple MZI components. The MZI 300 has an input region 302 and an output region 304. In an embodiment, the MZI 300 has two unequally long "arms"—labeled 306 and 308, wherein arm 308 is opposing arm 306. That is, L1 of arm 306 is different than L2 of arm 308, where L1 and L2 are the linear optical length of the respective arms. In another embodiment, MZI 300 has symmetric, opposing arms. In an embodiment, a first waveguide defining first arm 306 of the MZI 300 and the second waveguide defining second arm 308 of the MZI 300, branch off from the input region 302, and then recombine at output region 304, thereby providing two paths or channels through which light can travel through the MZI 300. In some implementations, the first waveguide arm 306 may be in close proximity or in direct contact with the second waveguide arm 308, such that the waveguides are optically coupled. The first arm 306 has a first optical length L1 and a first width W1. The second arm 308 has a second optical length L2 and a second width W2. The first arm 306 may be referred to as including a first leg 306a and a second leg 306b; the second arm 306 may be referred to as including a first leg 308a and a second leg 308b. The first arm 306 may include a waveguide having a core layer surrounded by cladding including an upper cladding layer and a lower cladding layer. The second arm 308 may include a waveguide having a core layer surrounded by cladding including an upper cladding layer and a lower cladding layer. In some implementations, the composition of the layers (e.g., upper cladding layer and/or core layer) may differ between the second arm 308 and first arm 306 such that there are thermo-optical coefficient (TOC) differences between the arms a discussed below in block 204. For example, in an embodiment, one region, e.g., the first arm 306, is formed to have materials such that the TOC is canceled out in whole or in part (e.g., positive TOC core material and negative TOC upper-cladding material). In an embodiment, the width W1 of the first arm 306 is different than the width W2 of the second arm 308. In an embodiment, W1 is greater than W2. The widths (W1, W2) and/or lengths (L1, L2) may be determined using the methods discussed below.

Again, as discussed above, the MZI component includes a waveguide having a core element surrounded by cladding including a lower cladding and an upper cladding all disposed over a substrate. The $n_i$ of a region of the MZI component (e.g., the region being one arm) is dependent upon the configuration of the waveguide including the materials of the waveguide layers within the respective region.

The MZI 300 is represented by a resonance formula:

$$m\lambda_o = n_1 L_1 - n_2 L_2$$

wherein $\lambda_o$ is the central wavelength, m is the interference order, $n_i$ and $L_i$ are the effective index of and the length of the respective MZI arm (here i=1 and 2). $n_1$ is the effective index of the arm 306, for example, found from the waveguide core, upper cladding and lower cladding of the arm 306. $n_2$ is the effective index of the arm 308, for example, found from the waveguide core, upper cladding and lower cladding of the arm 308. Considering a shift in wavelength of $\Delta\lambda$, the resonance formula is represented as:

$$m(\lambda_0 + \Delta\lambda) = \left(n_1 + \frac{\partial n_1}{\partial X}\Delta X + \frac{\partial n_1}{\partial \lambda}\Delta\lambda\right)L_1 - \left(n_2 + \frac{\partial n_2}{\partial X}\Delta X + \frac{\partial n_2}{\partial \lambda}\Delta\lambda\right)L_2$$

where $\Delta X$ is a variation of a parameter of the waveguide (e.g., thickness, width (w), temperature).

The method 200 includes block 204 where a compensation condition is determined. In some implementations, the compensation conditions include solving for both a fabrication insensitivity condition and an athermal operation condition. Referring to the example of block 202 and the MZI, an MZI structure includes two parameters to be selected for a design—the difference of two arms ($\Delta L$) and the effective refractive index of layers ($n_{eff}$). In some implementations, a width (w1, w2) and/or thickness (e.g., of the core). The compensation conditions select one of more of these parameters, as well as the other dimensional parameters, of the component to provide for a fabrication insensitivity condition and an athermal operation condition.

In an embodiment, the $n_i$ of a first region, such as a first arm, is different than the $n_i$ of a second region, such as a second arm. In an embodiment, a waveguide having silicon core is provided in two different arms of the MZI, and a lower cladding having a similar composition (e.g., silicon dioxide) is provided in both arms. However, in some implementations, including as discussed below, the upper cladding may differ between the first arm and the second arm. In other words, the upper cladding of the arm 306 is different than the upper cladding of the arm 308. That is, as the effective index $n_1$, $n_2$ is dependent upon the upper cladding, there is a difference in structure and thus effective index. In some implementations, a difference in thermo-optic coefficient (TOC) of the upper cladding layer is provided between two arms. Referring to the example of MZI 300, a different TOC between arm 306 and 308 may be provided. In an embodiment, block 204 includes determining and selecting a material configuration for the first arm and the second arm of the MZI.

The different TOC may be provided by differing upper cladding layer materials having different TOCs (e.g., one arm having negative TOC material as an upper cladding layer and a second arm having a greater value TOC material as an upper cladding layer). Additionally, or alternatively, the different TOCs between regions may be provided by a different waveguide core material between arm 306 and 308. There are also other configurations for providing a different TOC between arm 306 and 308 such as providing a different waveguide core material between arm 306 and 308. In an embodiment, a negative TOC material is positioned as upper cladding layer on one or the arms (e.g., arm 306) of the component, and a greater TOC material is positioned as upper cladding layer on the other arm. In an embodiment, FIG. 4D is illustrative of a difference in TOC based on waveguide with a negative TOC material versus use of another material such as silicon oxide.

The compensation conditions of block 204 may be determined by the following compensation condition equations:

$$\frac{L_1}{L_2} = \frac{\frac{dn_2}{dX}}{\frac{dn_1}{dX}} \qquad \text{compensation equation (1)}$$

wherein dn/dX=m(X) and X can be a width, thickness or temperature of the first region (arm 306) or second region (arm 308). And where $n_i$ is an $n_{eff}$ of Region i (here 1 (arm 306) or 2 (arm 308)). In some implementations, $L_2$ may be defined with respect to m(X) where X is the width (w):

$$L_2 = \frac{\lambda^2}{FSR} \times \frac{1}{n_{g,1}(w_1)\frac{m(w_2)}{m(w_1)} - n_{g,2}(w_2)} \qquad \text{compensation equation (2)}$$

where FSR is the free spectral range, $n_{g,i}$ is the effective group index of region i (here 1 (arm 306) or 2 (arm 308)), $w_i$ is the respective width of region i (here 1 (arm 306) or 2 (arm 308)).

In a first step of the block 204, $L_1$ may be solved for a fabrication insensitive condition. In an implementation, $L_1$ is solved for width. In an implementation, the relationship between the configuration of region 1, arm 306, and region 2, arm 308, of the MZI 300 is determined. In particular, the relationship between the width w1, length $L_1$ and width w2, length $L_2$ may be determined. In an embodiment, a first step solves for length $L_1$ of the arm 306 that provides a width-insensitive device. $L_1$ solution can apply:

$$\frac{L_1}{L_2} = \frac{\frac{dn_{eff1}}{dw}}{\frac{dn_{eff2}}{dw}}$$

Figure 4A:
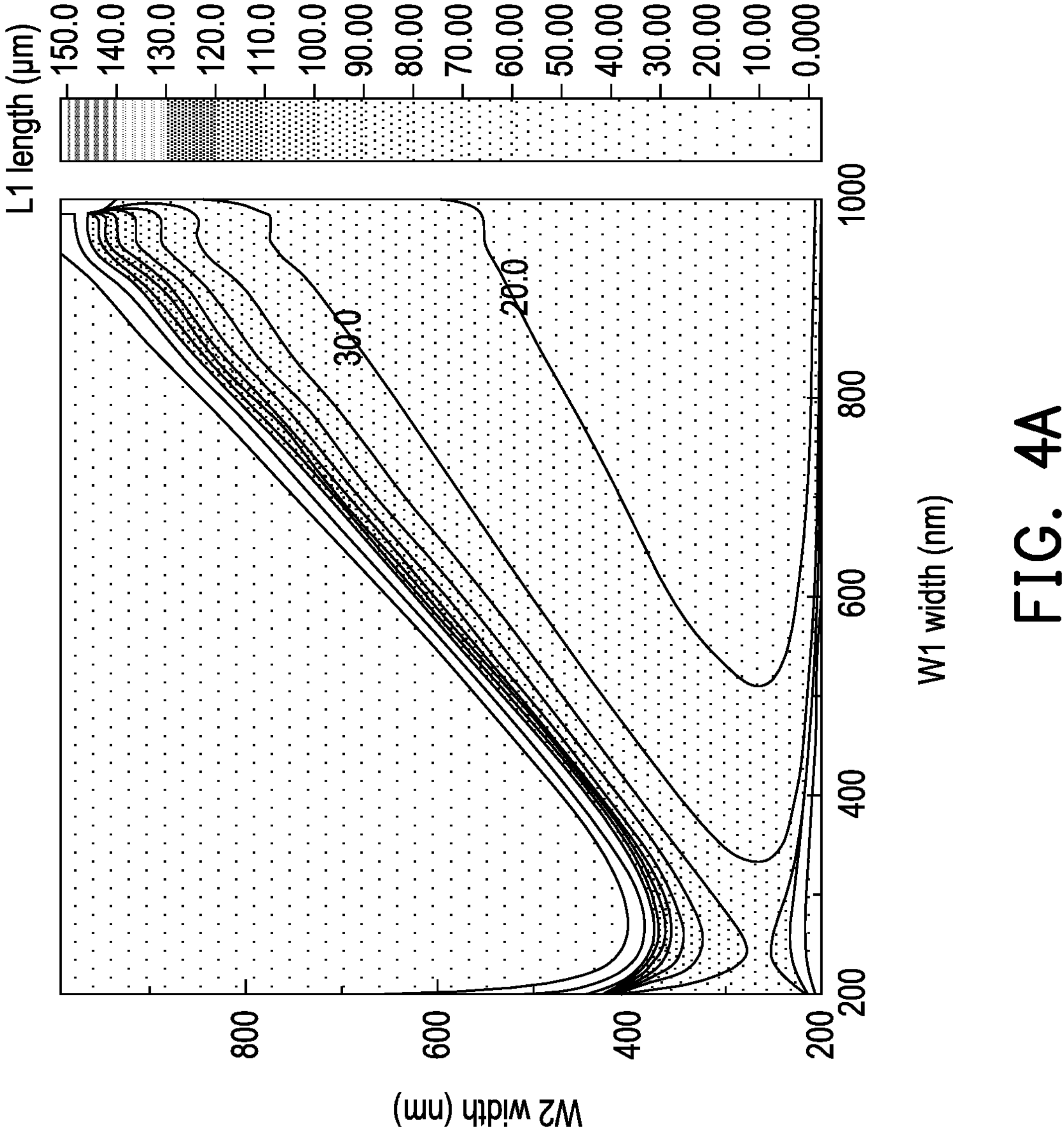
FIGS. 4A, 4B, 4C, and 4D show a graphical illustration of varying parameters of an MZI of FIG. 3 according to embodiments of the present disclosure.
Figure 4B:
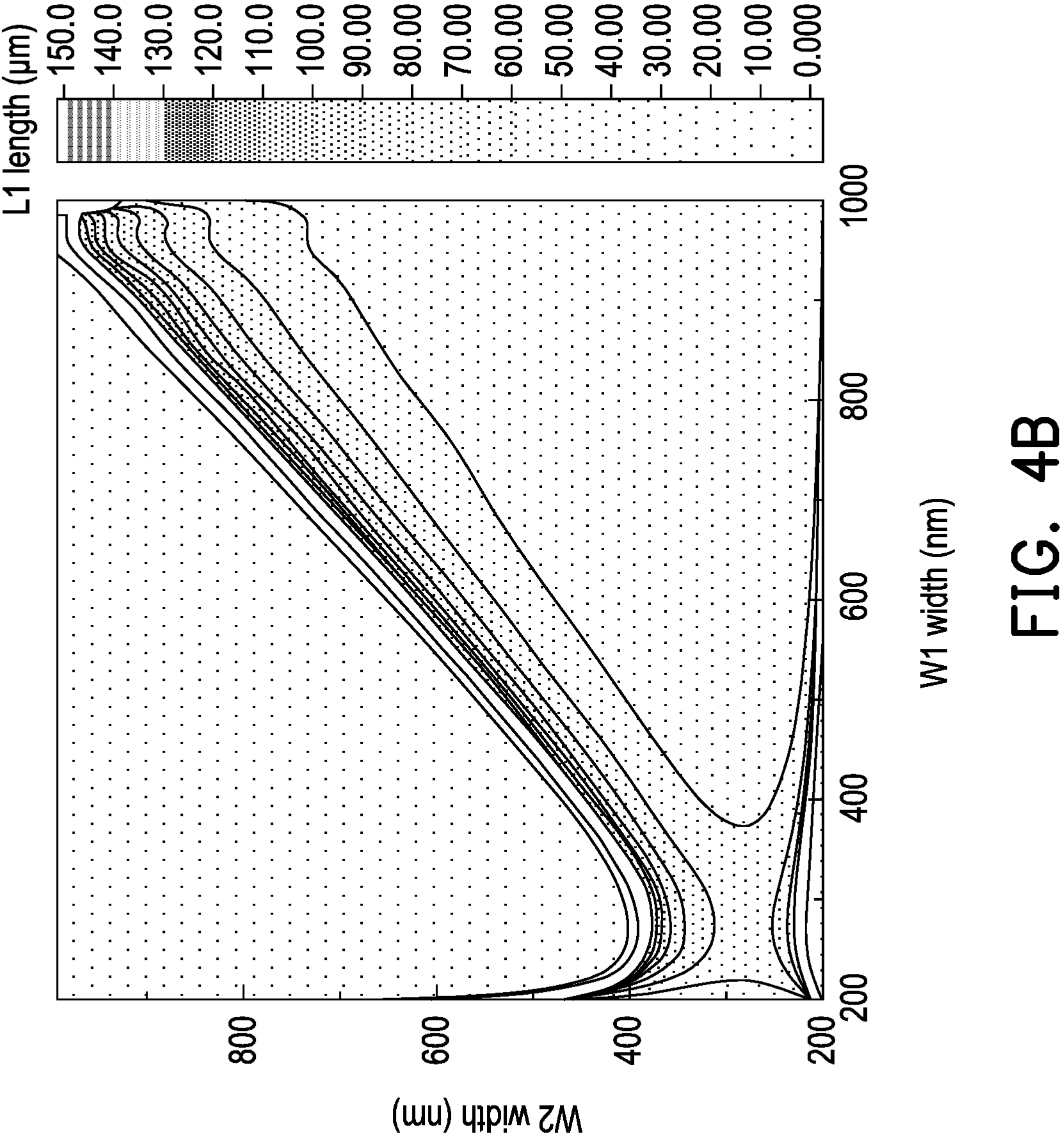

FIG. 4A illustrates a graphical representation of a solution for length $L_1$ over varying width w1 and width w2. FIG. 4B illustrates a graphical representation of a solution for length $L_2$ over varying width w1 and width w2. Each solution provided by step one of block 204 can achieve a width insensitive component performance.

It is noted that the equation immediately above is provided by letting the variation of the resonance formula of the component have a variation effect of a variation of width to be close to zero:

$$\frac{\Delta\lambda}{\Delta w} = \frac{\frac{\partial n_1}{\partial w}L_1 - \frac{\partial n_2}{\partial w}L_2}{n_{g,1}L_1 - n_{g,2}L_2}\lambda_0 \Rightarrow 0$$

where ng,1 and ng,2 are the respective group effective indices of arm 1 and arm 2 respectively. This results then in compensation equation 1.

The free spectral range (FSR) is a shift in effective index versus a wavelength. In an implementation, FSR is provided for the MZI by the following:

$$FSR = \frac{\lambda^2}{n_{g,1}L_1 - n_{g,2}L_2}$$

From this representation of the FSR, the compensation equation 1 can be substituted for L1 making FSR equal to (=)

$$\frac{\lambda^2}{L_2\left(n_{g,1}\frac{dn_2/dX}{dn_1/dX} - n_{g,2}\right)}$$

setting dn/dX=m(X) where X can be the width, thickness or temperature for considering the compensation conditions. In an implementation where X is width (w), the FSR equals (=)

$$\frac{\lambda^2}{L_2\left(n_{g,1}(w_1)\frac{m(w_2)}{m(w_1)} - n_{g,2}(w_2)\right)}$$

Solving for L2 gives compensation equation 2, above. The above example solutions are provided for width (w), but other configurations are also possible. Including application of length and temperature as variable (X) and/or the compensation parameters to be accounted for.

In some implementations, in a subsequent step of block 204, a temperature factor is solved for. If the temperature factor is zero, or close thereto, the component configuration is considered temperature insensitive. This is also referred to as allowing for athermal operation. The temperature factor (temperature factor) is solved by the following:

$$\frac{\partial n_{eff1}}{\partial T}L_1 - \frac{\partial n_{eff2}}{\partial T}L_2$$

Figure 4C:
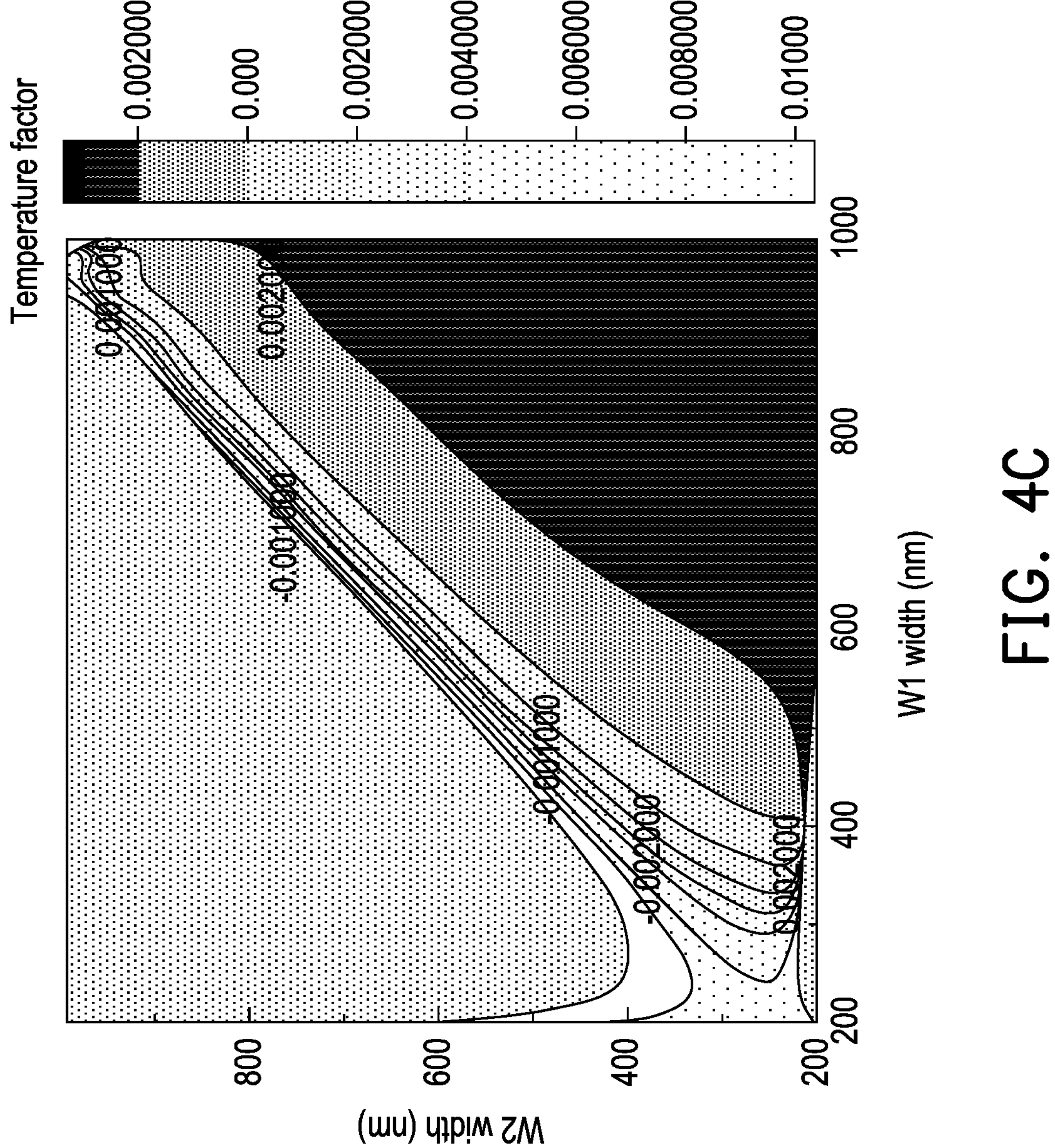
Figure 4D:
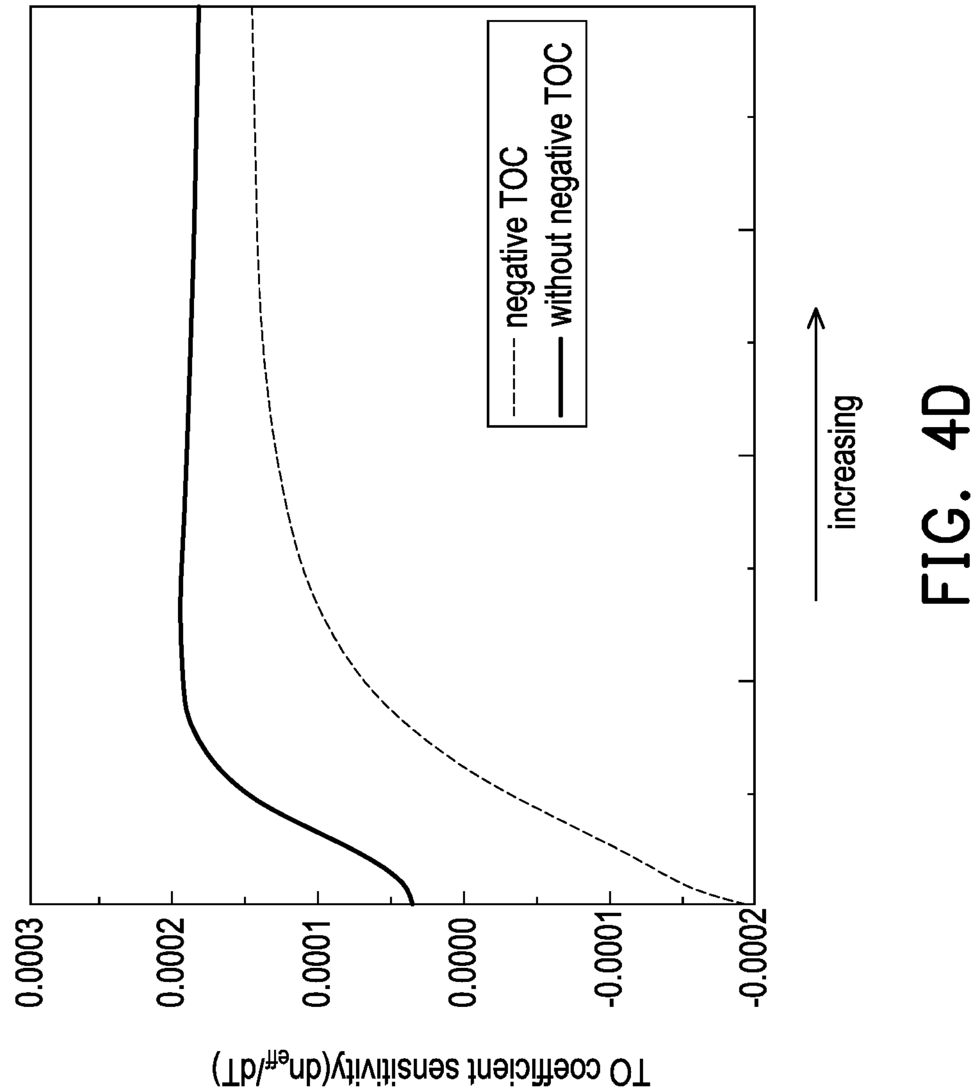

FIG. 4C illustrates a solution for a temperature factor that is zero, or close-thereto, for a variation of width w1 and w2. FIG. 4D is illustrative of a graphical representation of a TOC sensitivity versus waveguide width for a component having a negative TOC as an upper cladding versus another upper cladding (e.g., SiO2).

Thus, in one stage, a fabrication insensitive condition is determined. The fabrication insensitive configuration may be multiple solutions, where those multiple solutions are various dimensions of the waveguide(s) such as determining the upper arm waveguide widths and/or upper arm waveguide lengths. And in a second stage, a temperature insensitive configuration is determined. In some implementations, because the design of the configuration of the MZI provides for the effective index change induced by a width variation of the MZI to be canceled such that there is no impact to the optical phase. It is canceled due to the engineering of the component—for example, placing the negative TOC over one region (arm 306) and/or implementing parameters (e.g., L1, w1) solved according to the equations discussed above. In other words, solutions for the $n_{eff}$, width and length are provided.

Thus, by providing localized changes in the MZI design, such as modification of the refractive index of a region of the device is an adjustment that allows for fabrication and/or thermal insensitivity of the resultant device. In some implementations, implementing the devices and/or methods discussed herein provide for a shift of spectra response in a few picometers (pm). In some embodiments, the temperature sensitivity may be reduced to less than approximately 1 pm/K.

Figure 5A:
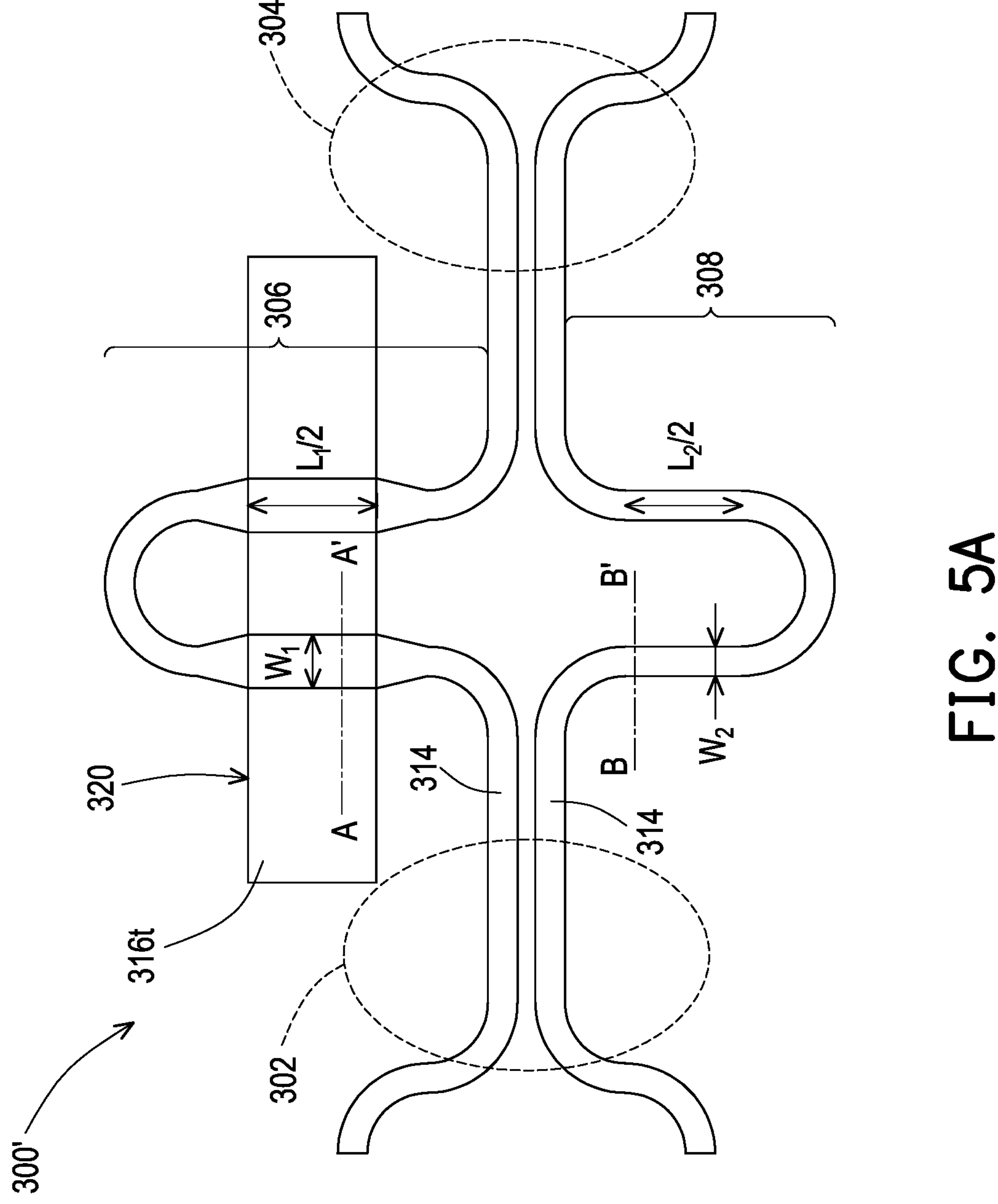
FIG. 5A shows a diagram of an MZI having a thermo-optic coefficient (TOC) compensation region from a top view.

The method 200 then proceeds to block 206 where the component of blocks 202 and 204 is fabricated. In an embodiment, the component is an MZI formed as part of a photonic integrated circuit (PIC). Block 206 is described below in conjunction with FIGS. 5A, 5B, 5C, which illustrate fragmentary cross-sectional views of a MZI 300' according to an embodiment of method 200. FIG. 5A illustrates a top view of the MZI 300' with respect to the waveguide core 314.

Figure 5B:
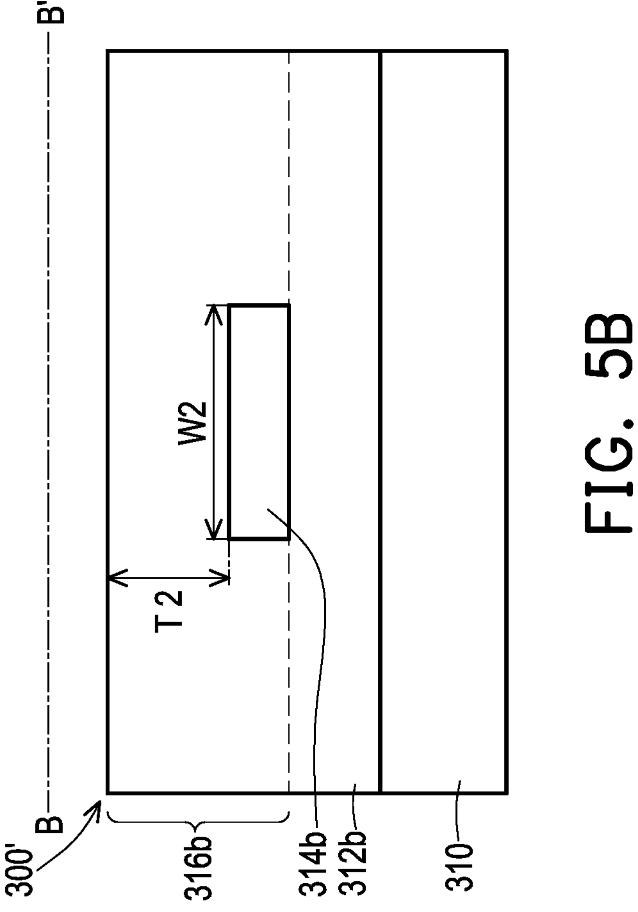
FIGS. 5B and 5C show corresponding cross-sectional views of the MZI having a TOC compensation region, according to embodiments of the present disclosure.
Figure 5C:
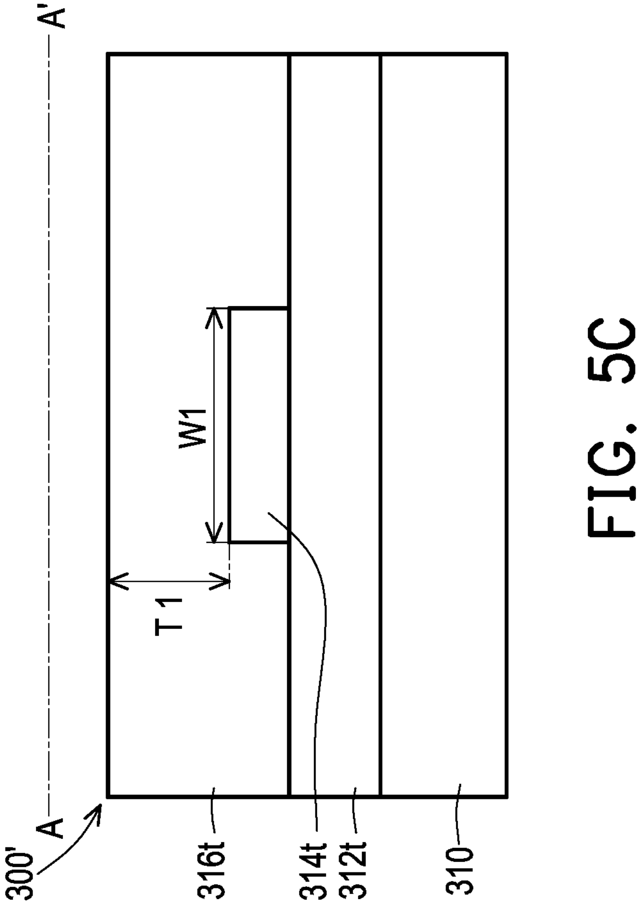

FIGS. 5A, 5B, and 5C illustrates an embodiment of an MZI 300'. The MZI 300' may be substantially similar to the MZI 300 described above with reference to FIG. 3. The MZI 300' includes a substrate 310. In one embodiment, the substrate 310 may be a silicon (Si) substrate. In some other embodiments, the substrate 310 may include other semiconductor materials such as germanium (Ge), silicon germanium (SiGe), or a III-V semiconductor material. Example III-V semiconductor materials may include gallium arsenide (GaAs), indium phosphide (InP), gallium phosphide (GaP), gallium nitride (GaN), gallium arsenide phosphide (GaAsP), aluminum indium arsenide (AlInAs), aluminum gallium arsenide (AlGaAs), gallium indium phosphide (GaInP), and indium gallium arsenide (InGaAs). In an embodiment, the substrate 310 is a silicon-on-insulator (SOI) substrate. The substrate 310 may include multiple n-type well regions and multiple p-type well regions. A p-type well region may be doped with a p-type dopant (i.e., boron (B)). An n-type well region may be doped with an n-type dopant (i.e., phosphorus (P) or arsenic (As)).

A lower cladding layer 312 is formed over the substrate 310. In an embodiment, the lower cladding layer 312 is silicon dioxide ($SiO_2$). Other exemplary dielectrics include other suitable oxides, silicon nitride, silicon carbide, low-k dielectric material, and/or other suitable materials. The TOC of the lower cladding layer 312 may be negligible compared to that of the material of the core 314 and/or the upper cladding layer 316, discussed below. In an embodiment, the lower cladding layer 312 is formed by chemical vapor deposition (CVD), low pressure (LPCVD) plasma enhanced chemical vapor deposition (PECVD) process, thermal oxidation, and/or other suitable deposition process. In an embodiment, the lower cladding layer 312 is a BOX layer formed in a silicon substrate 310.

The lower cladding layer 312 positioned in the second arm 308 is denoted lower cladding layer 312*b*, the lower cladding layer 312 positioned in the first arm 306 is denoted lower cladding layer 312*t*. The lower cladding 312*b* and 312*t* may be a same material (e.g., SiO2). In some implementations, the lower cladding layer 312*b* and 312*t* may be regions of a singular continuous layer (e.g., formed in a single deposition step). In some implementations, the lower cladding layer 312*b* laterally encloses the waveguide core 314*b* in the second arm 308 region.

A waveguide core element (also referred to as a wire) 314 is formed over the lower cladding layer 312. In an embodiment, the core 314 is silicon. In an embodiment, the core 314 is SU-8 resist. In some implementations, the core 314 and the substrate 310 comprise a same material. The core 314 may be formed by suitable semiconductor processes such as deposition of the core material, and photolithography and etching to pattern the core material. In some implementations, hard mask layers are used in the patterning of the core 314.

The core 314 of the second arm 308 is denoted core layer 314*b*, the core 314 positioned in the first arm 306 is denoted core layer 314*t*. In some implementations, the core 314*t* is the same composition as the core layer 314*b*. The core 314, including core 314*b* and 314*t*, are formed simultaneously from deposition and patterning processes. In other embodiments (see FIG. 12A), the core 314*t* may have a different composition than the core layer 314*b*.

The core 314*t* and the core 314*b* may have different dimensional features. In an embodiment, the core 314*t* has a longer length than the core 314*b*. L1 may be greater than L2. The core 314*t* may have a width of W1. In an embodiment, the width W1 may be between approximately 300 nm and approximately 1000 nm. In an embodiment, the width W1 is determined based on the compensation equations discussed above with reference to block 204 of the method 200. The core 314*b* may have a width of W2. In an embodiment, the width W2 may be between approximately 300 nm and approximately 1000 nm. In an embodiment, the width W2 is less than the width W1. In an embodiment, the width W2 may be approximately 5-50% less than the width W1.

The ratio of the optical lengths L1 and L2 may be between 1 and 35, that is $0 \leq L1/L2 \leq 35$. In a further embodiment, the range of lengths L1/L2 is between approximately 1.25 and 3. The optical lengths L1 and L2 and the ratio therebetween may be determined by the compensation equations of block 204 discussed above.

To complete the waveguide, an upper cladding layer 316 is formed over the core 314. The upper cladding layer 316*t* is formed over the core 314*t* in the first arm 306. The upper cladding layer 316*b* is formed over the core 314*b* in the second arm 308. In an embodiment, the upper cladding layer 316*t* and upper cladding layer 316*b* are a different material. For example, the upper cladding layer 316*t* and upper cladding layer 316*b* have a different TOC. In other implementations, such as the example of FIG. 12A, the upper-cladding layers 316*b*, 316*t* may be the same.

In an embodiment, the upper cladding layer 316*b* of the second arm 308 of the MZI 300' is a same material as the lower cladding layer 312*b* of the second arm 308. In a further embodiment, the upper cladding layer 316*b* is silicon dioxide. In an embodiment, the upper cladding layer 316*b* laterally encloses and covers the core 314*b*. The upper cladding layer 316*b* may have a thickness T2 above the core 314*b*. In some implementations, the thickness T2 of the upper cladding layer 316*b* is equal to the thickness T1 of the upper-cladding layer 316*t*, discussed below. In an embodiment, the upper cladding layer 316*b* has a same sign (e.g., positive) as the waveguide core 314 it is disposed upon.

The upper cladding layer 316*t* disposed on the first arm 306 of the MZI 300' has a TOC of an opposite sign as the TOC of the core material 314*t* of that region (e.g., negative TOC and positive TOC). In an embodiment, the upper cladding layer 316*t* is a material having a negative TOC, and the core material 314*t* is a material having a positive TOC. For example, the upper-cladding layer 316*t* may be a negative TOC material and the core material 314*t* may be silicon. Athermal optimization of components having a silicon core is provided by upper cladding layer 316_t_ with a negative TOC that can offset the positive TOC of a silicon core 314_t_.

An exemplary negative TOC material (e.g., suitable for the upper-cladding layer 316_t_ material) is a form of titanium dioxide ($TiO_2$). For example, an amorphous $TiO_2$ material, deposited for example by sputtering, provides a negative TOC material. In an embodiment, the negative TOC material is an amorphous $TiO_2$ including rutile, brookite, and anatase forms of $TiO_2$. In an embodiment, the refractive index of the negative TOC material (e.g., $TiO_2$) is between approximately 2.1-2.5. In an embodiment, the temperature sensitivity of the negative TOC material (e.g., amorphous $TiO_2$) is approximately −1e4 to −2e−4 dn/dT. In some implementations, providing a sputter deposited amorphous $TiO_2$ may also provide a low optical loss for the waveguide.

In an embodiment, the negative TOC material such as amorphous $TiO_2$ is deposited by sputtering processes such as RF magnetron sputtering. In some implementations, the sputtering may be followed by an anneal. The flowrate including presence of oxygen may determine the form of the amorphous $TiO_2$ (e.g., the percentage of phases of $TiO_2$ present). In an embodiment, the negative TOC material is amorphous $TiO_2$ including at least 10% of a first form and at least 10% of a second form, where the forms are selected from rutile, brookite, and anatase forms. In an embodiment, a negative TOC material is formed by providing dopants into a material (e.g., $TiO_2$ as discussed above, $SiO_2$, etc.). Exemplary dopants include phosphorous, boron, and/or other suitable dopants.

The upper cladding layer 316_t_ has a thickness T1 extending above the core 314_t_. In an embodiment, the thickness T1 is approximately 300 nm or greater (e.g., the thickness above the core 314_t_ is greater than approximately 300 nm). In other embodiments, the thickness T1 may equal a thickness of the core 314_t_ measured in the same direction. For example, a top surface of the upper-cladding layer 316_t_ may be coplanar or level with the top surface of the core 314_t_.

The region of the arm 306 having the upper cladding layer 316_t_ providing a TOC with an opposite sign as the core 314_t_ is referred to as a TOC compensation region, which is denoted TOC compensation region 320 (FIG. 5A). The TOC compensation region 320 includes the region of the component where material combination that balances TOC is applied thereby providing a cancelation (in whole or in part) of the effective index change.

In an embodiment, the temperature factor of the MZI 300' is provided by the equation as follows (discussed above)

$$\frac{\partial n_{eff1}}{\partial T}L_1 - \frac{\partial n_{eff2}}{\partial T}L_2 = \text{Temperature factor}$$

In some implementations, the MZI 300' exhibits approximately −1e−3 μm/K<Temperature factor<approximately 1e−3 μm/K.

Thus, the method 200 at block 206 includes forming two regions of a device at least one of the regions including a TOC compensation region. In an implementation, a lower cladding layer such as lower cladding layer 312 is formed over the substrate 310. A waveguide core element 314 is formed over the lower cladding layer 312. In some implementations, the waveguide core element is formed by depositing a core material and patterning the material in accordance to the component design of block 204 (e.g., W1, W2, L1, L2). In an embodiment, an upper cladding layer 316 is then formed over the patterned core element 314_b_, 314_t_. The upper cladding layer 316 may be formed by depositing a first material (e.g., one of 316_t_, 316_b_), patterning said material such that it is removed from one region of the device (e.g., 316_t_ is removed from arm 308 or 316_b_ is removed from the TOC compensation region 320), and the second material upper cladding material is deposited and patterned (e.g., 316_t_ is formed in TOC compensation region 320 or 316_b_ is formed outside of the TOC compensation region). In other words, the upper cladding material, as it in some embodiments is two different materials, may be formed in two separate, sequential steps.

Figure 6:
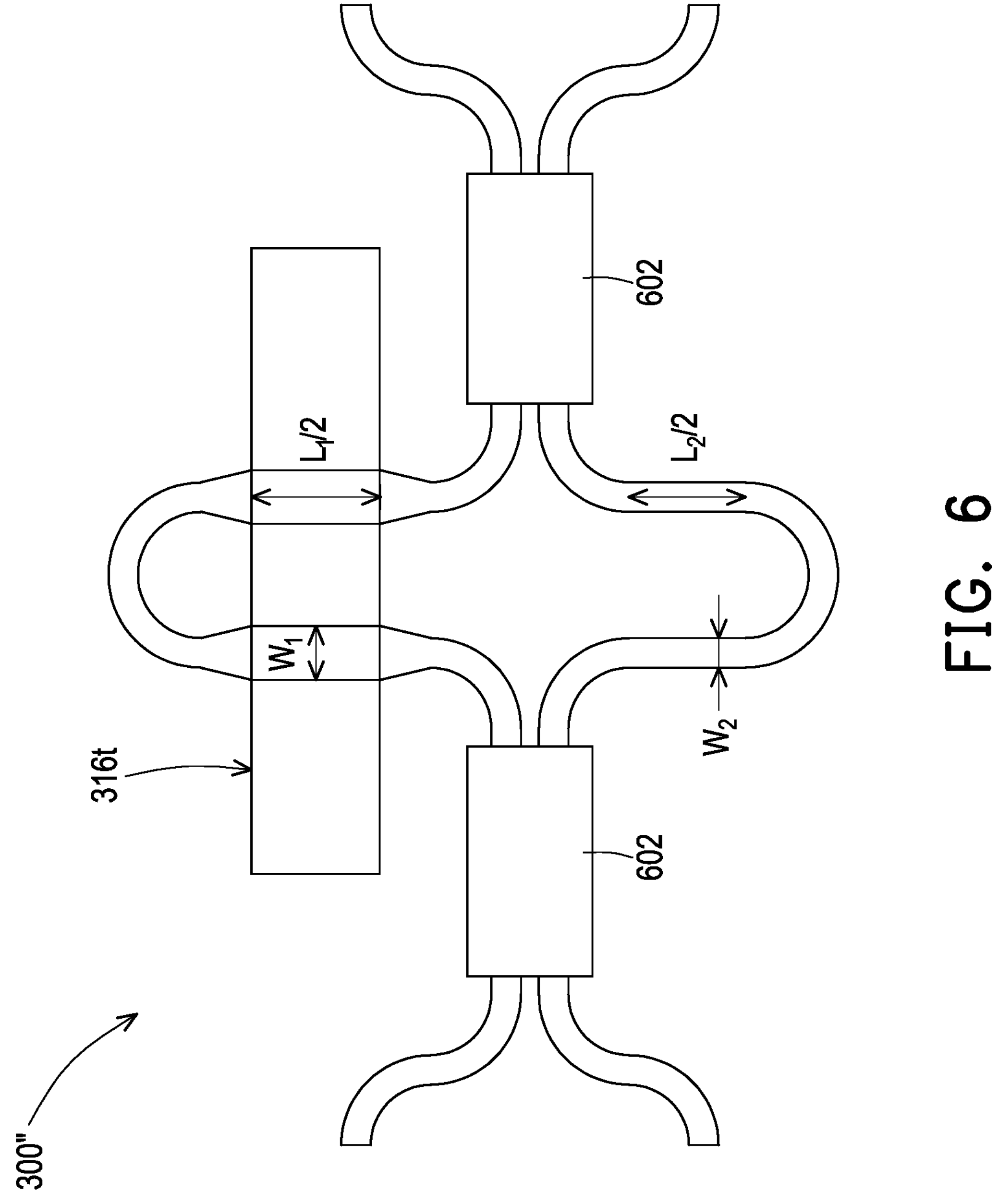
FIG. 6 shows a diagram of a Mach-Zehnder Interferometer (MZI), according to an embodiment of the present disclosure.

The method 200 may then proceed to continue fabrication in block 208 including providing other components of the PIC including interconnections to MZI 300'. In an embodiment, the MZI 300' is one component of a plurality of components forming a device such as DMX of FIG. 1 and/or other suitable configurations such as discussed below. After fabrication, the component is suitable for operation by providing a light to input 302, passing the light through a path provided by the arm 306 or a path provided by the arm 308. Each path having different properties and thus providing a different phase of light output at output 304. In implementations, the light is rejoined at output 304. For example, an embodiment illustrated as MZI 300" in FIG. 6, optical couplers 602 are included in the component. The MZI 300" is substantially similar to the MZI 300' of FIGS. 5A, 5B, 5C and further illustrates optical coupling components at the input and output of the MZI 300". In an embodiment, the optical coupler is a multimode interface (MMI) coupler, an MZI coupler, and/or other suitable component. In an embodiment, the coupler 602 is a 3-dB coupler.

The refractive index (n) in the device as fabricated should be very close to the design value so that the waveguide has the desired spectral response. A high refractive index contrast and small feature size make silicon photonics circuits such as exemplary MZI 300' sensitive to nanometer-scale variations in geometries, which can be induced by process variations and local pattern density of the mask layout. Those variations can affect the effective index and group index of the guided waveguide mode, which in turns changes the phase delay between two arms of an interferometric filter circuit and shifts the filter responses. Applying the method 200 and the resultant devices, such as MZI 300', can mitigate this by providing a configuration that is more insensitive to fabrication conditions (e.g., deviations from the design value) and thermal conditions. In particular, embodiments of the method and devices discussed herein form an MZI that allows cancellation of the effective index change from a waveguide width variation, thereby keeping the same optical difference desired from input to output of the MZI. Further, the method and devices not only allow to cancel the effective index change to waveguide variations but reduce the temperature sensitivity.

Turning now to FIGS. 7-12B, illustrated are a plurality of embodiments of devices that may be designed and/or fabricated according to the method 200 of FIG. 2 and/or implement the device features of the MZI 300' discussed above. Throughout the present disclosure, like reference numerals are used to denote like features.

Figure 7A:
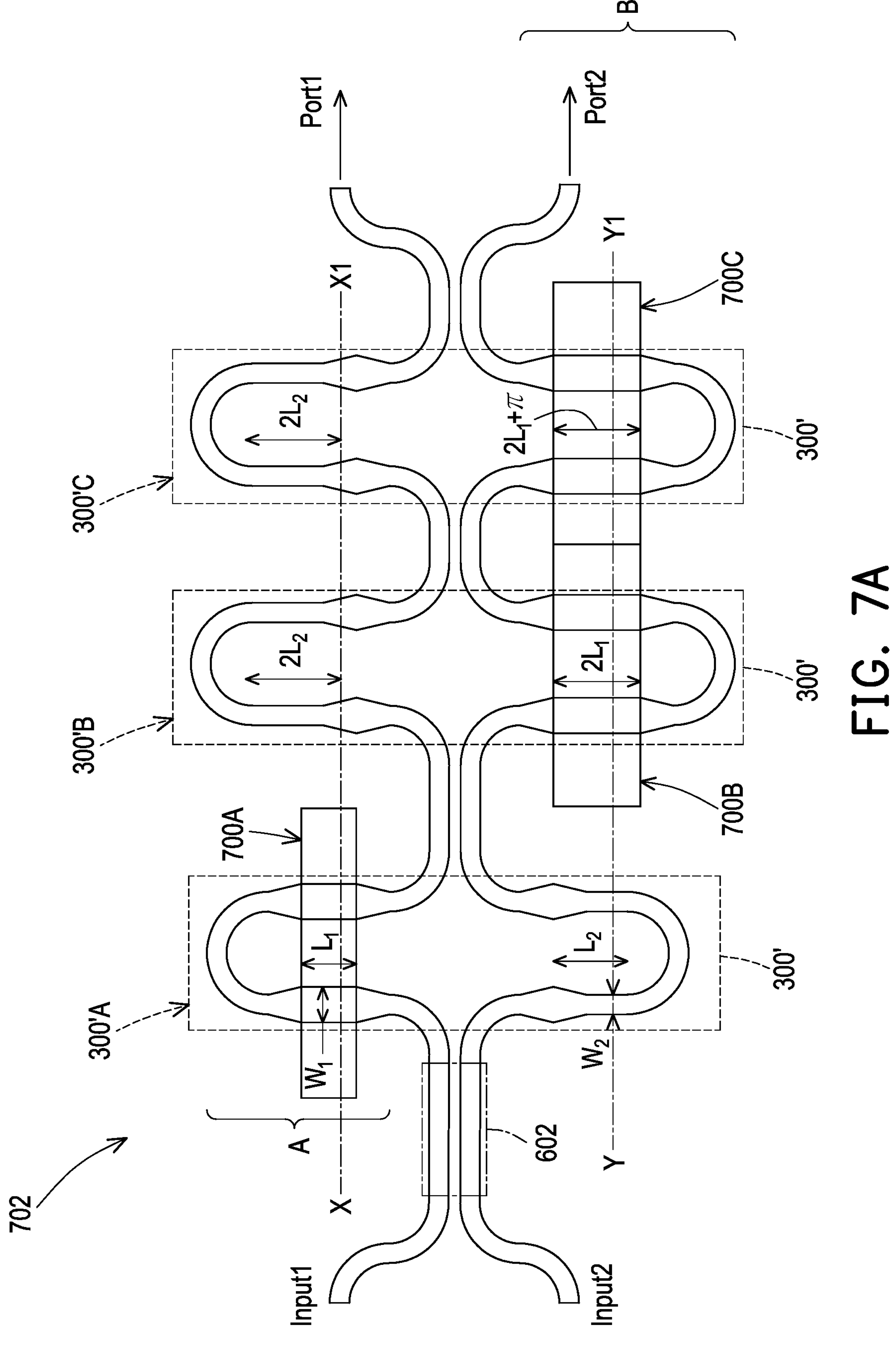
FIG. 7A shows a diagram of a top view of another embodiment of a photonic device including a multi-stage MZI.
Figure 7B:
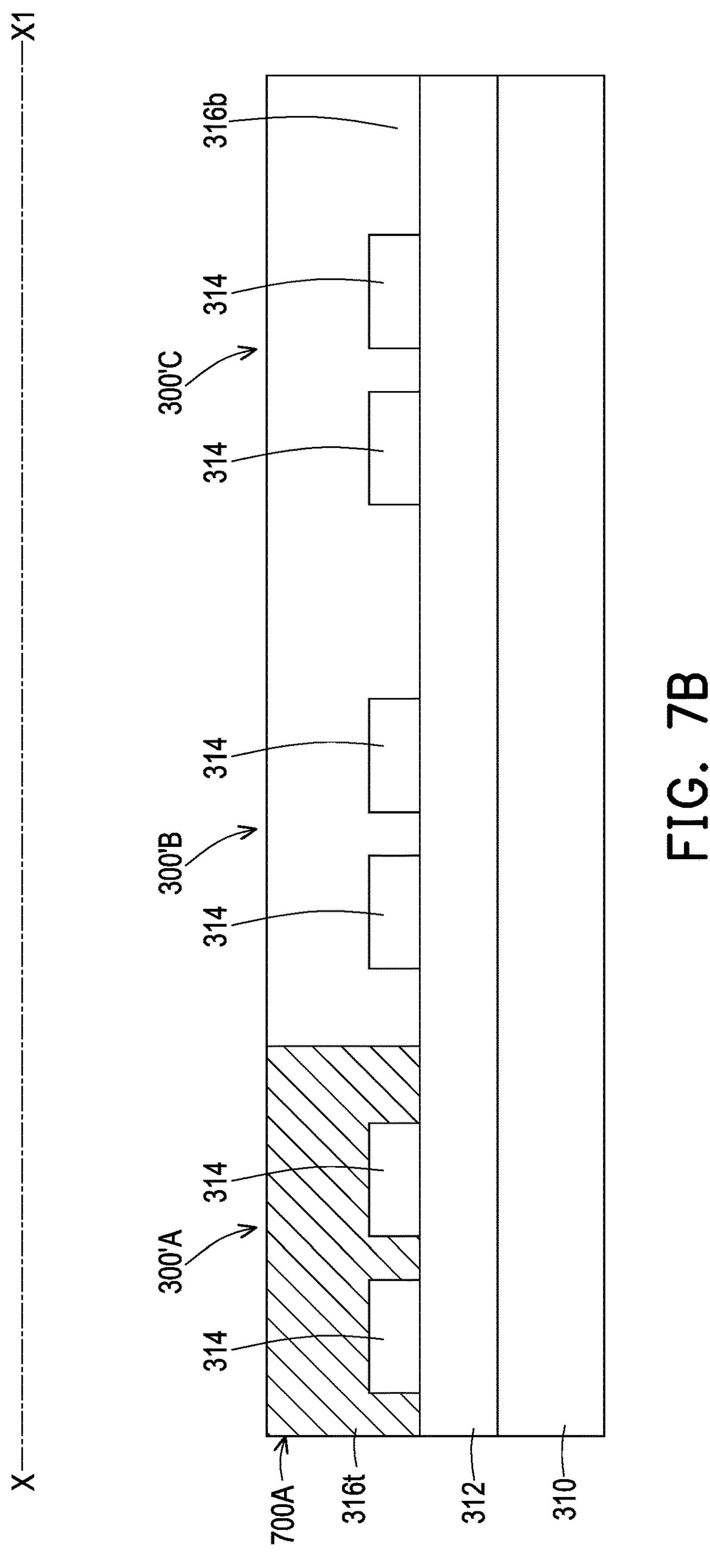
FIGS. 7B and 7C show corresponding cross-sectional views, each according to embodiments of the present disclosure.
Figure 7C:
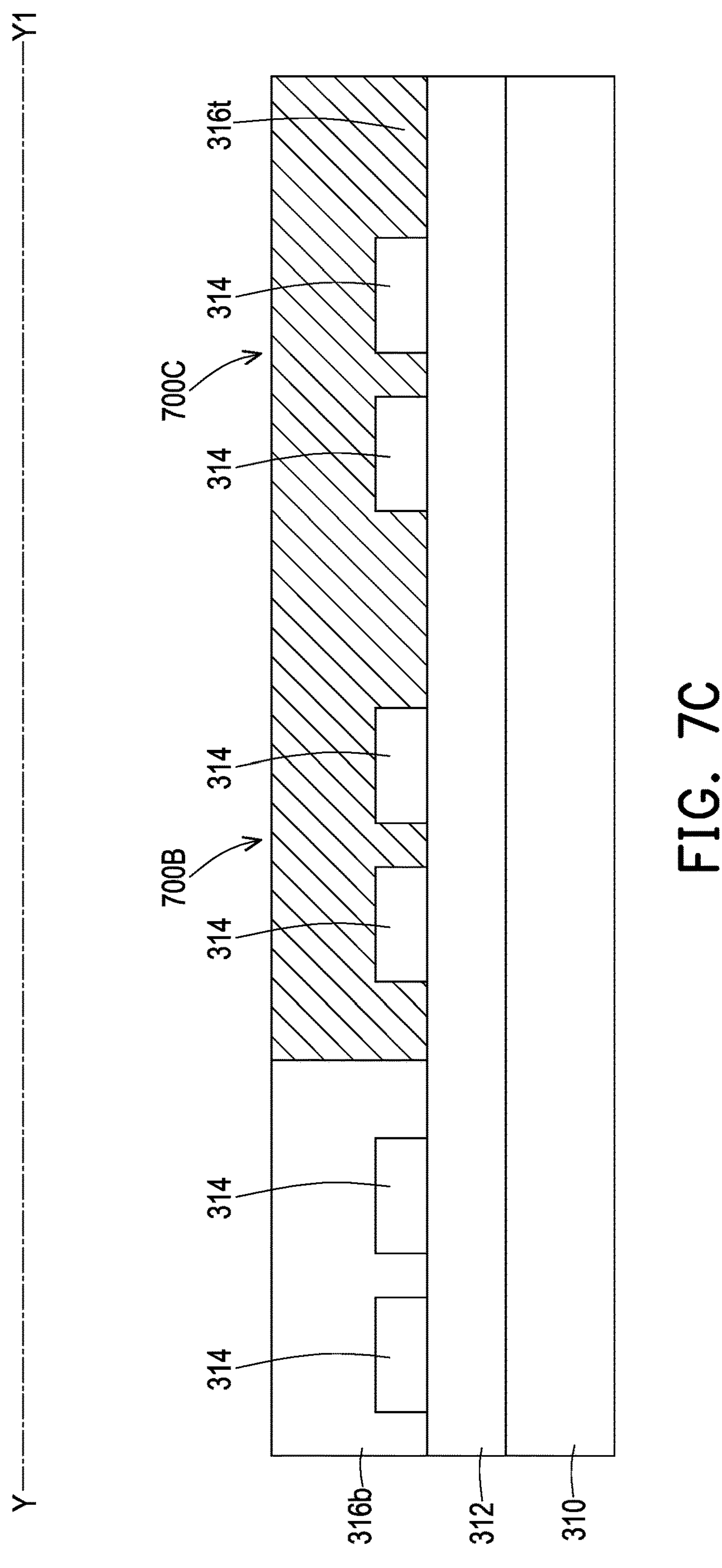

Referring to FIGS. 7A, 7B, 7C, illustrated is a device 702. The device 702 is a three-stage MZI; in other embodiments, any number of stages of MZI is possible. The device 702 includes a first input (Input1) and second input (Input2) extending to an optical coupler 602, a first MZI 300'A, a second MZI 300'B, and a third MZI 300'C are connected in series providing signal to a first outlet (Port1) and a second outlet (Port2). The output wavelength of the Port1 is provided by a first delayed optical path (e.g., arms denoted A of the respective MZIs); the output wavelength of the Port2 is provided by a second delated optical path (e.g., arms B denoted of the respective MZIs). In an embodiment, the output wavelength at Port1 is approximately 1270 nm and the output wavelength at Port2 is approximately 1330 nm. In an embodiment, the filtering effect of the device 702 provides a nearly sine wave output from MZI 300'A. Through additional stages (here two additional stages illustrated as MZI 300'B and MZI 300'C), the output may be filtered closer to a square wave signal. In another embodiment, the device 702 includes a single input.

The first MZI 300'A, second MZI 300'B, and third MZI 300'C each include a first arm labeled A and an opposing second arm labeled B. The arms may be substantially similar to as discussed above with reference to arms 306, 308 of the MZI 300'. Each MZI has an unbalanced structure in that a respective TOC modification region 700 is provided on one of the two arms of each MZI. In the illustrated embodiment, a TOC compensation region 700A is provided on a first arm A of the MZI 300'A, a second TOC compensation region 700B is provided on a second arm B of the MZI 300'B, a third TOC compensation region 700C is provided on a second arm B of the third MZI 300'C.

In an embodiment, the TOC compensation region 700A is defined by a region of the device (e.g., waveguide) having an upper cladding layer material with a TOC having an opposite sign than that of the waveguide core in that region. For example, the TOC compensation region 700A may include a negative TOC material as an upper cladding layer over the waveguide core substantially similar to the upper cladding layer 316*t* of the MZI 300' described above with reference to FIGS. 5A, 5B, 5C. In an embodiment, in the TOC modification region 700A, an upper cladding of sputter-deposited, amorphous $TiO_2$ is disposed over a silicon waveguide core. In contrast, in the arm B of the MZI 300'A, an upper cladding layer substantially similar to the upper cladding layer 316*b* of the MZI 300' described above with reference to FIGS. 5A, 5B, and 5C is provided. In an embodiment, arm B of the MZI 300'A has silicon oxide disposed over a silicon waveguide core. In arm B, there is no compensating TOC material.

In an embodiment, the TOC compensation region 700B is defined by a region having an upper cladding layer material with a TOC having an opposite sign than that of the waveguide core in the region. For example, the TOC compensation region 700B may include a negative TOC material as an upper cladding layer over the waveguide core substantially similar to the upper cladding layer 316*t* of the MZI 300' described above with reference to FIGS. 5A, 5B, 5C. In an embodiment, in the TOC modification region 700B, an upper cladding layer of sputter-deposited, amorphous $TiO_2$ material is disposed over a silicon waveguide core. In contrast, in the arm A of the MZI 300'B, an upper cladding layer substantially similar to the upper cladding layer 316*b* of the MZI 300' described above with reference to FIGS. 5A, 5B, and 5C is provided. In an embodiment, arm A of the MZI 300'B has silicon oxide disposed over a silicon waveguide core. That is, in arm A of the MZI 300'B, there is no compensating TOC material.

In an embodiment, the TOC compensation region 700C is defined by a region having an upper cladding layer comprised of a material with a TOC having an opposite sign than that the waveguide core in the region. For example, the TOC compensation region 700C may include a negative TOC material as an upper cladding layer over the waveguide core substantially similar to the upper cladding layer 316*t* of the MZI 300' described above with reference to FIGS. 5A, 5B, 5C. In an embodiment, in the TOC modification region 700C, an upper cladding layer of sputter-deposited, amorphous $TiO_2$ is disposed over a silicon waveguide core. In contrast, in the arm A of the MZI 300'C, an over-cladding layer substantially similar to the upper cladding layer 316*b* of the MZI 300' described above with reference to FIGS. 5A, 5B, and 5C is provided. In an embodiment, arm A of the MZI 300'C has silicon oxide disposed over a silicon waveguide core. That is, in arm A of the MZI 300'C, there is no compensating TOC material.

FIGS. 7B and 7C are illustrate of a cross-sectional cut at X-X1 and Y-Y1 on FIG. 7A, respectively. That is, in a TOC compensation region 700A, an upper cladding layer 316*t* (e.g., a negative TOC material) overlies a core 314 (e.g., silicon) and an upper cladding layer 316*b* (e.g., a greater TOC material such as silicon oxide) overlies a core 314 (e.g., silicon) in MZI 300'B and 300'C along cut X-X'. In cut Y-Y' at the opposite side of the MZIs, TOC compensation regions 700B and 700C each include an upper cladding layer 316*t* (e.g., a negative TOC material) overlying a core 314 (e.g., silicon) and in MZI 300'A, an upper cladding layer 316*b* (e.g., a greater TOC material such as silicon oxide) overlies a core 314 (e.g., silicon). As discussed in other embodiments herein (e.g., with reference to FIG. 12A), the TOC compensation regions 700A, 700B, 700C may alternatively be provided by modifying the core material with respect to the upper cladding layers in the TOC compensation regions 700A, 700B, 700C as compared to the opposing arm of the MZI 300'A, MZI 300'B, and MZI 300'° C. respectively and maintaining a same composition upper cladding layer. In each implementation, one arm of the MZI has a TOC compensation region.

In other embodiments, the TOC compensation regions 700A, 700B and 700C may be configured on arm A of MZI 300'A, on arm A of MZI 300'B, and on arm A of MZI 300'C, respectively while arm B of the respective MZI components do not include a TOC compensation region. In other embodiments, the TOC compensation regions 700A, 700B and 700C may be configured on arm B of MZI 300'A, on arm B of MZI 300'B, and on arm B of MZI 300'C, while arm A of the respective MZI components do not include a TOC compensation region. In some implementations of these embodiments, the TOC compensation regions are provided by a negative TOC material as an upper cladding layer, in a single, contiguous layer extending across the components. Other configurations of the TOC compensation regions are possible that are implemented asymmetrically with respect to the two arms of a single MZI device.

Figure 8:
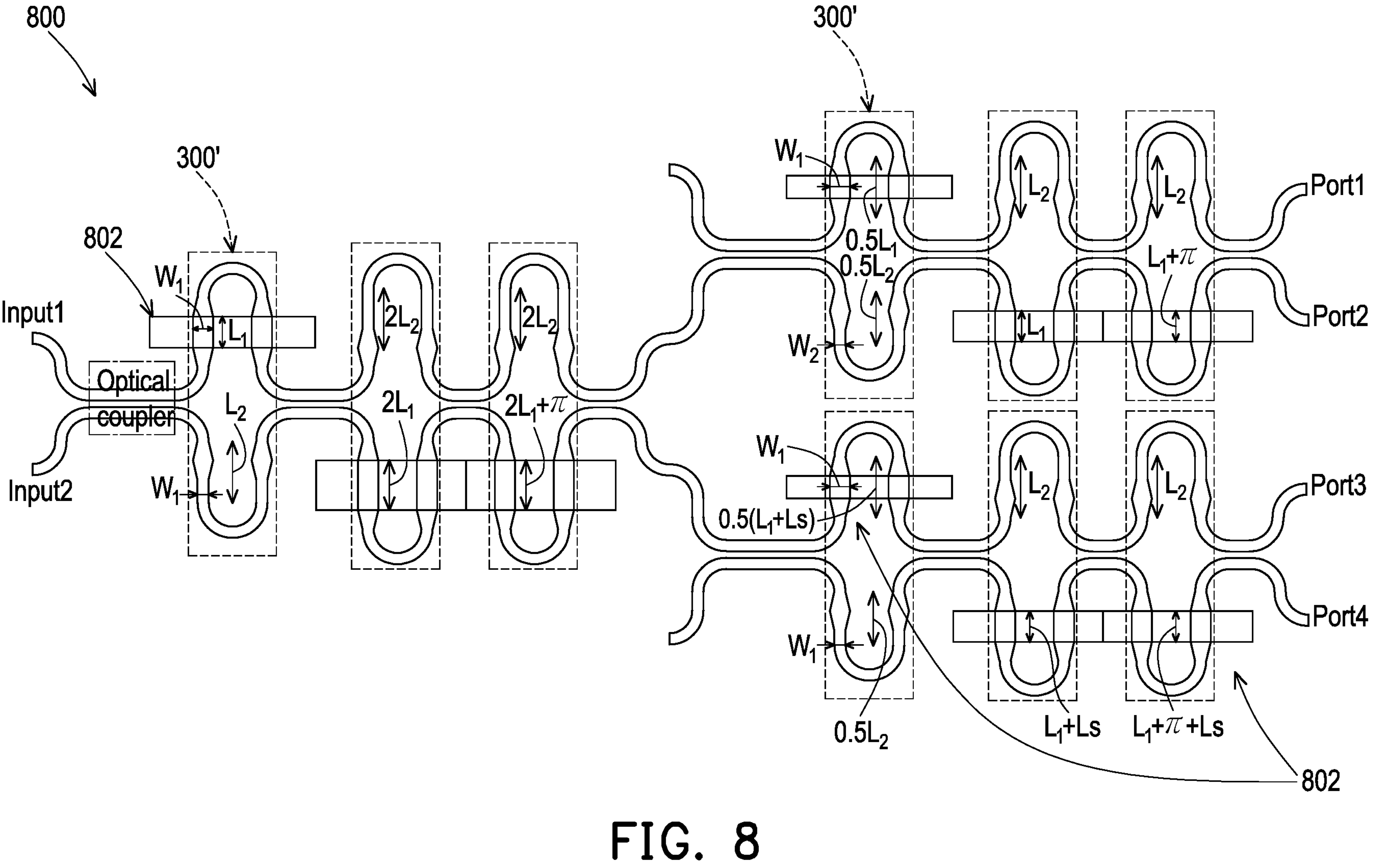
FIG. 8 shows a diagram of a top view of another embodiment of a photonic device including a multi-stage MZIs connected in series, according to embodiments of the present disclosure.

Referring to FIG. 8, illustrated is a device 800 comprising multiple MZIs connected in series. The device 800 includes a plurality of MZI 300', which may be substantially similar to as discussed above with reference to FIGS. 5A, 5B, 5C. Each MZI 300' of FIG. 8 is illustrated as including a TOC compensation region 802. The TOC compensation regions 802 may be substantially similar to the TOC compensation regions 700A, B, C of FIGS. 7A, 7B, 7C respectively and/or the compensation regions 320 of FIGS. 5A, 5B, 5C. FIG. 8 illustrates exemplary relative length annotations for each of the MZI 300'. It is noted that each of the lengths (e.g., L1, L2) are adjustable and may be selected according to the method 200 including the compensation equations discussed above. It is noted that each of the widths are adjustable and may be selected according to the method 200 including the compensation equations discussed above. In an embodiment, one or more of the negative TOC as an upper cladding layer is omitted.

The illustrated embodiment includes the optical coupler 602 has a first input and a second input. In other embodiments, the optical coupler 602 incudes a single input. The optical coupler 602 may be an MMI coupler, MZI coupler and/or other suitable component.

The wavelength of light output at each output port is different. For example, in an embodiment, the output at Port 1 is a first wavelength such as approximately 1270 nm. In an embodiment, the output at Port 2 is a second wavelength such as approximately 1310 nm. In an embodiment, the output at Port 3 is a third wavelength such as approximately 1290 nm. In an embodiment, the output at Port 4 is a fourth wavelength such as approximately 1330 nm.

Figure 9A:
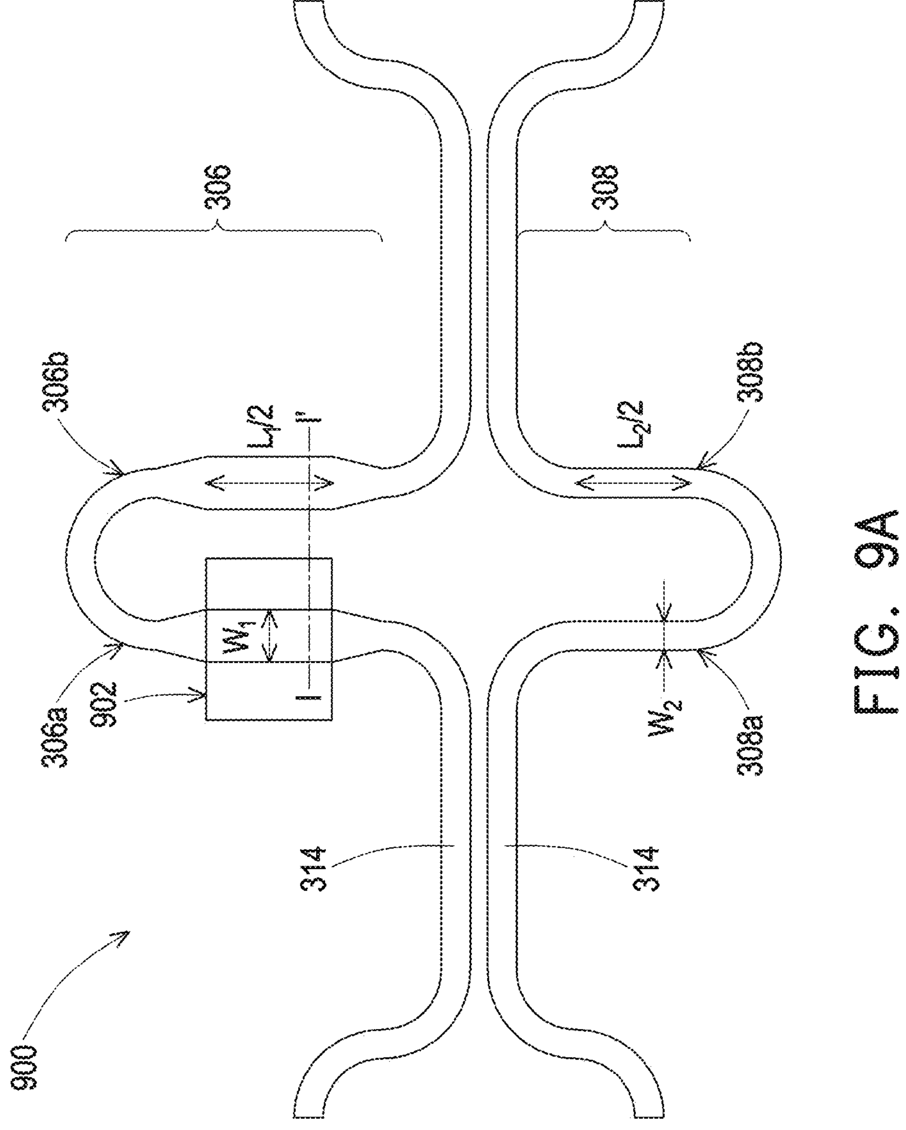
FIG. 9A shows a diagram of another embodiment of an MZI having a TOC compensation region from a top view.
Figure 9B:
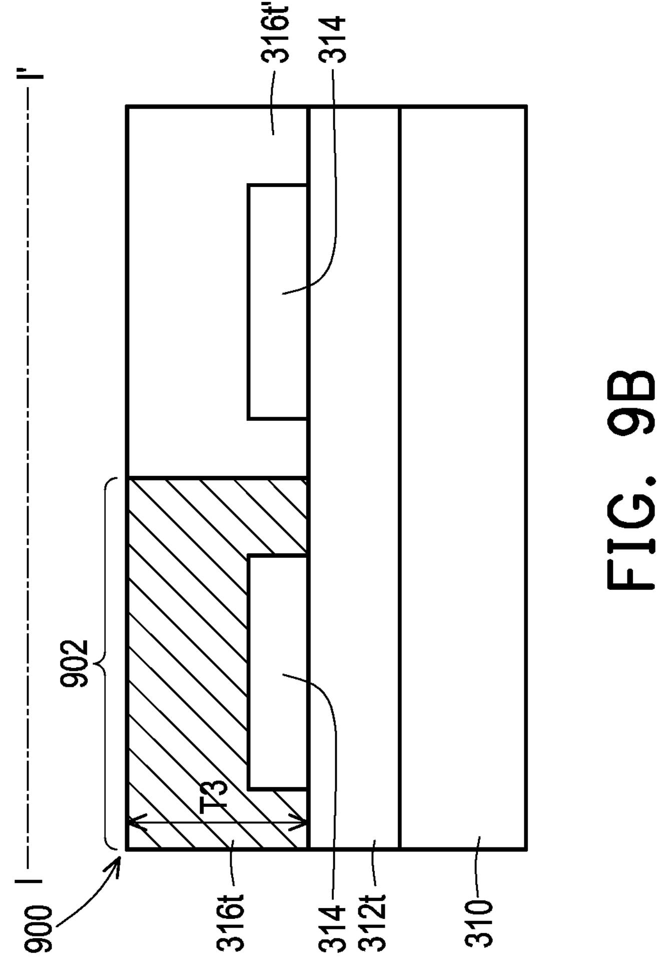
FIG. 9B shows a corresponding cross-sectional view of the MZI, according to embodiments of the present disclosure.

Referring now to FIGS. 9A, 9B, illustrated is another embodiment of an MZI illustrated as MZI 900. The MZI 900 may be substantially similar to the MZI 300' described above with reference to FIGS. 5A, 5B, 5C except that the TOC compensation region (e.g., including negative TOC material as an upper cladding layer 316*t*) of the MZI 900 is limited to only one leg 306*a* of the first arm 306. This is illustrated as TOC compensation region 902 in the MZI 900. The TOC compensation region 902 may be substantially similar to the TOC compensation region 320. In an embodiment, the waveguide includes a core 314 providing a first linear leg 306*a* and a second linear leg 306*b* to provide a first arm 306, and upper cladding on one linear leg is different than the second linear leg. For example, the upper cladding on one linear leg may be a material of a different TOC sign (e.g., negative TOC material) and the upper cladding on another leg has a greater TOC (e.g., SiO2). FIG. 9B illustrates a first upper cladding 316*t* that may be a negative TOC material and a second upper cladding 316*t'* that may be a higher TOC material such as silicon oxide. In an embodiment, the negative TOC material includes a sputtered deposited amorphous $TiO_2$ such as discussed above with reference to 316*t* at FIGS. 5A, 5B, 5C. In a further embodiment, the index is between approximately 2-approximately 2.5. In a further embodiment, the TOC is between approximately −1e−4 to approximately −5e−4/K.

In an embodiment, the TOC compensation region 902 has a length $L_1/2$. In an embodiment, the TOC compensation region 902 has a length of between approximately $0.5*L_1/2$ to approximately $1.5*L_1/2$. In an embodiment, the TOC compensation region 902 has a width greater than W1. In an embodiment, the width of the negative TOC material is about 0.5*W1 to 2*W1. In an embodiment, a thickness T3 of the upper cladding material 316 is between approximately 10 nm and approximately 1000 nm.

In an embodiment, the negative TOC material is formed by providing dopants into the TOC material to reduce the index change. Exemplary dopants include phosphorous, boron, and/or other suitable dopants. In other words, in some embodiments, the TOC compensation region 902 is defined by a doped region of the upper cladding material that is position over the arm 306. This is equally applicable to the other devices in the present disclosure.

Figure 10A:
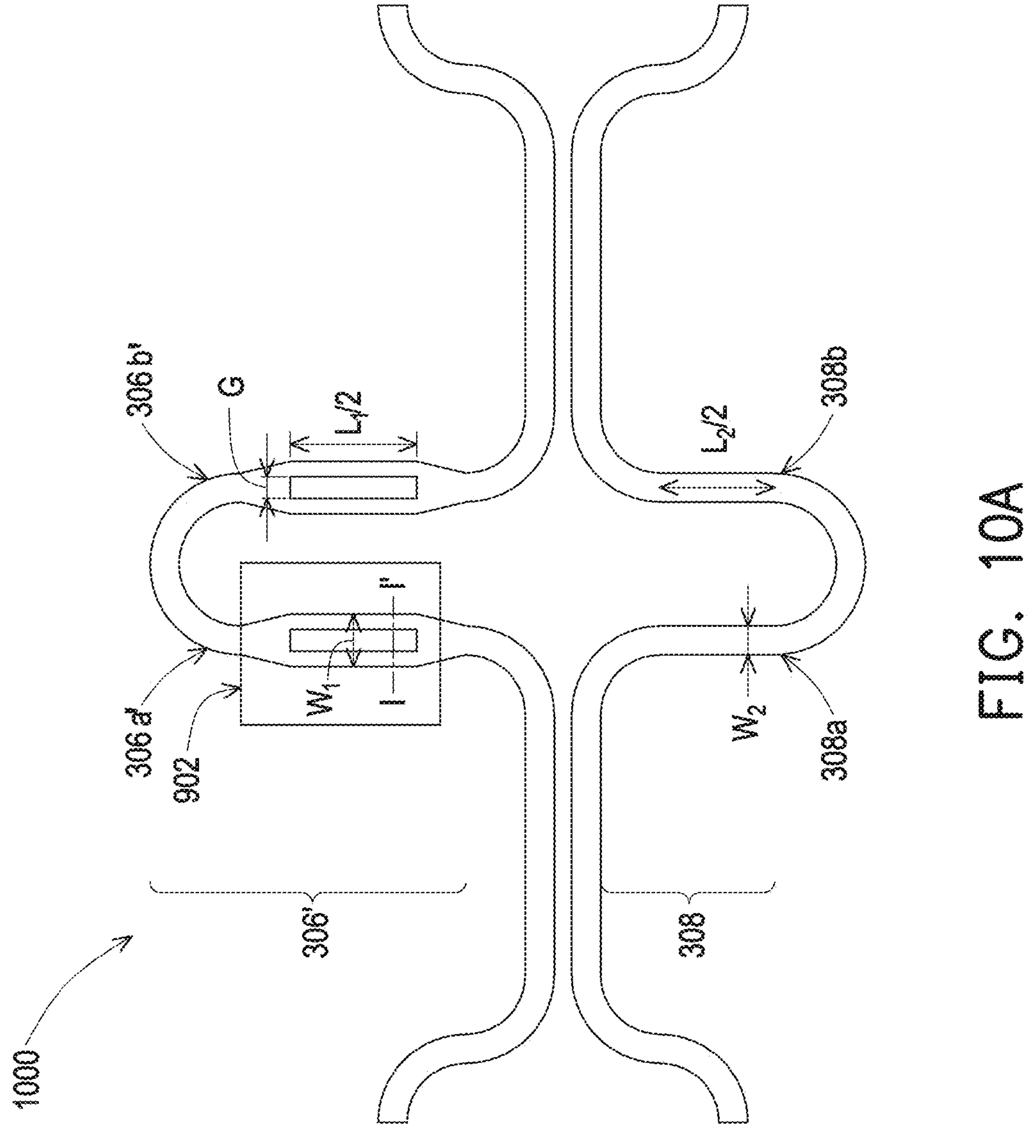
FIG. 10A shows a diagram of another embodiment of an MZI having a TOC compensation region from a top view.
Figure 10B:
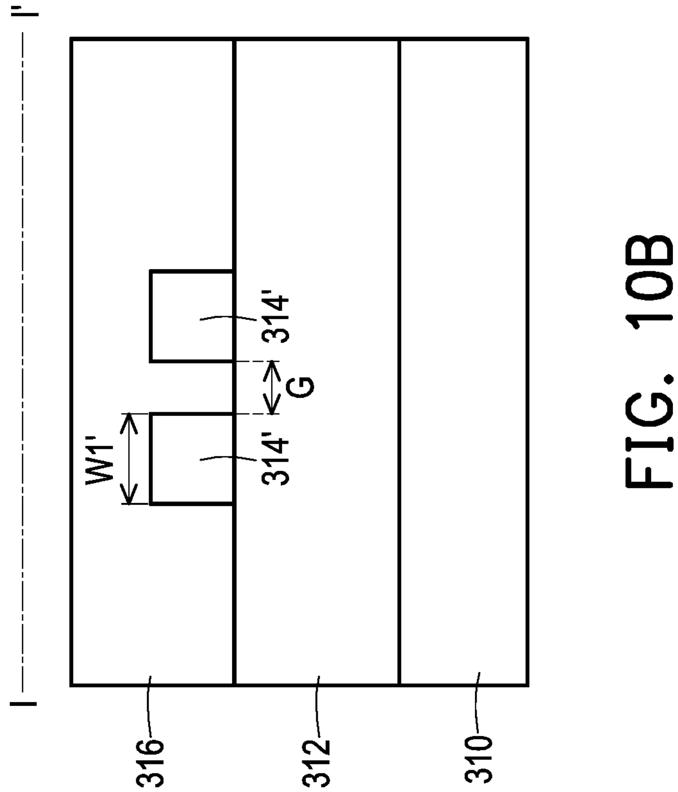
FIG. 10B shows a corresponding cross-sectional view of the MZI, according to embodiments of the present disclosure.

Referring now to FIGS. 10A, 10B, 10C illustrated is an embodiment of an MZI 1000. The MZI 1000 component is substantially similar to the MZI 300' described above with reference to FIGS. 5A, 5B, and 5C and/or substantially similar to the MZI 900 described above with reference to FIGS. 9A and 9B. The embodiment of MZI 1000 has an arm 306' that is configured with a core 314 being configured as a "slot" MZI. A slot configuration provides a gap (G) within the core 314 in the linear leg portion 306*a'*, 306*b'* of the arm 306. In an embodiment, the width W1' extends between one edge of the core 314 to the other edge of the core 314 in a top view. Width W1' may be between approximately 100 nm and approximately 300 nm. In an embodiment, the gap (G) has a horizontal dimension of between approximately 50 nm and approximately 150 nm. In an embodiment, the TOC compensation region 902 is placed over one leg of the arm 306. In other embodiments, the TOC compensation region may extend over both legs 306*a*, 306*b* of the arm 306 such as illustrated with respect to the MZI 300' of FIGS. 5A, 5B, 5C.

Figure 11:
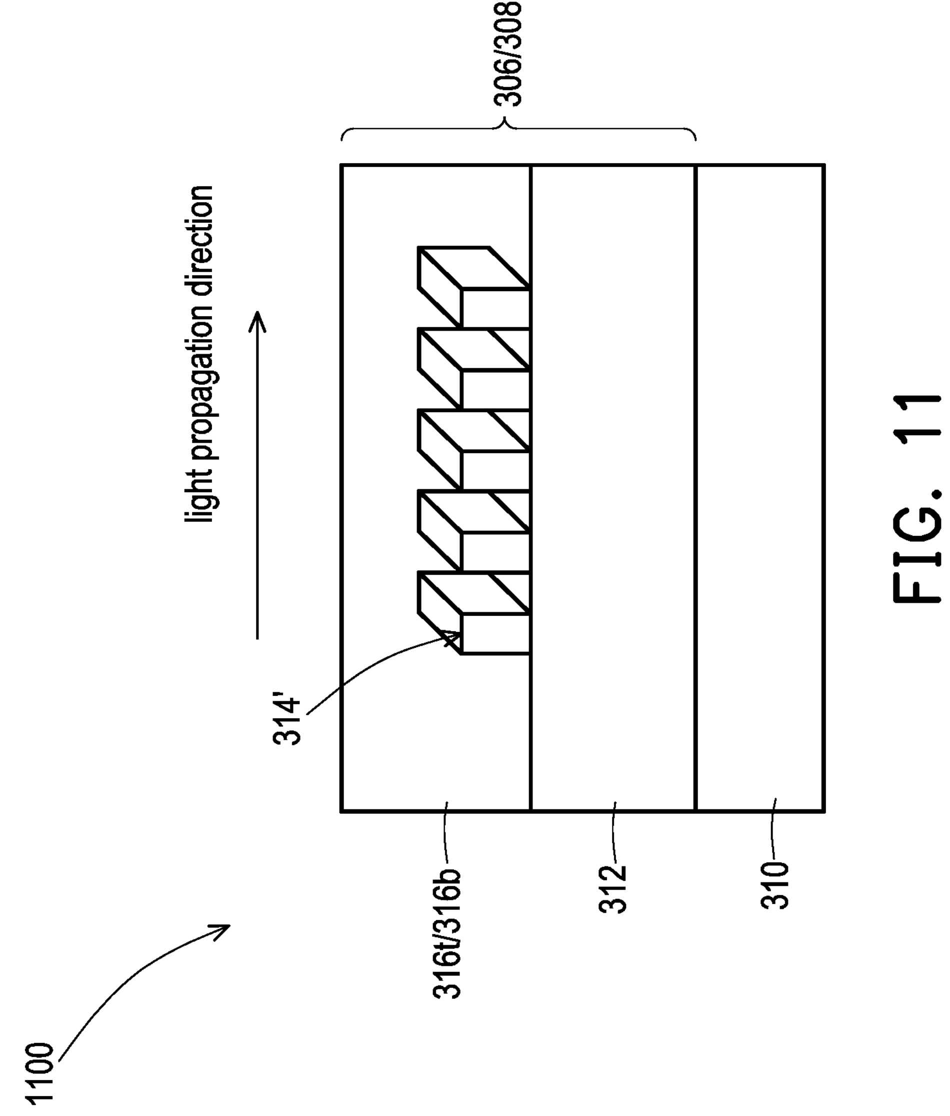
FIG. 11 shows perspective view of an MZI having sub-wavelength grating structure, according to embodiments of the present disclosure.

Referring now to FIG. 11, illustrated is an embodiment of an MZI 1100. The MZI component 1100 may be substantially similar to the MZI 300' as discussed above with reference to FIGS. 5A, 5B, and 5C. The embodiment of FIG. 11 differs in that the waveguide of MZI component 1100 has subwavelength grating (SWG) configuration. In other words, the core 314 of the first and/or second arm 306, 308 of the MZI component 1100 is configured as a SWG 314'. In an embodiment, in one arm, for example arm 306, has a TOC compensation region 320 providing the upper cladding layer 316*t* formed over the core 314' having an SWG structure. The upper cladding layer 316*t* may be substantially similar to as discussed above. That is, the upper cladding layer 316*t* over the SWG core 314' may be a negative TOC material such as, for example, a sputtered amorphous $TiO_2$ while the SWG core 314' is silicon. In an embodiment, the MZI 1100 has a second arm, for example arm 308 opposing the first arm 306, where an upper cladding layer 316*b* is formed in the SWG structure. The upper cladding layer 316*b* may be substantially similar to as discussed above. That is, the upper cladding layer 316*b* over the SWG core 314' in a second arm 308 may be a material such as $SiO_2$.

The configuration of the MZI component 1100 may be determined by the method 200 as discussed above. In an SWG waveguide configuration, an effective material refractive index $n_{eff}$ of the equivalent linear waveguide is determined by spatial averaging of refractive indexes of the waveguide core 314' (e.g. Si) and the respective cladding materials 312, 316. The SWG configuration may be applied to the waveguide to reduce the propagation loss of the component compared to other configurations. The MZI 1000 including the SWG core 314' has a first arm with a TOC compensation region and including the SWG core 314' and a second arm without a TOC compensation region and including the SWG core 314'.

Figure 12A:
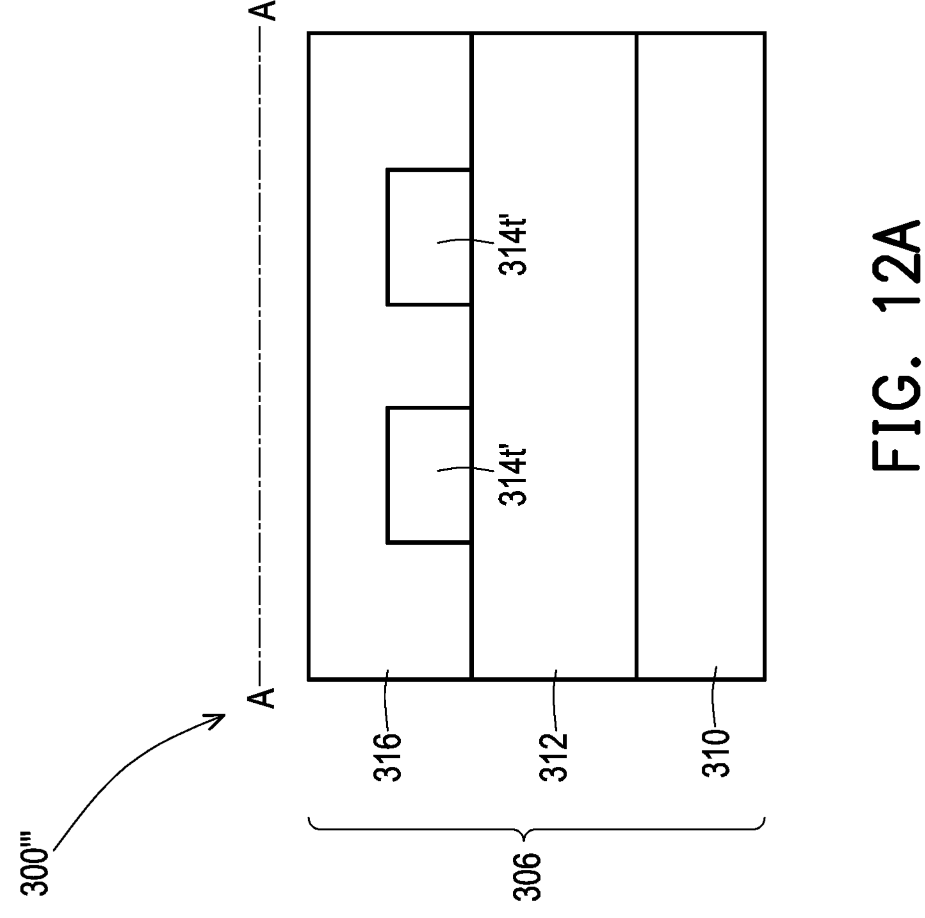
FIGS. 12A and 12B shows cross-sectional views of a first arm and a second arm of an MZI respectively, according to embodiments of the present disclosure.
Figure 12B:
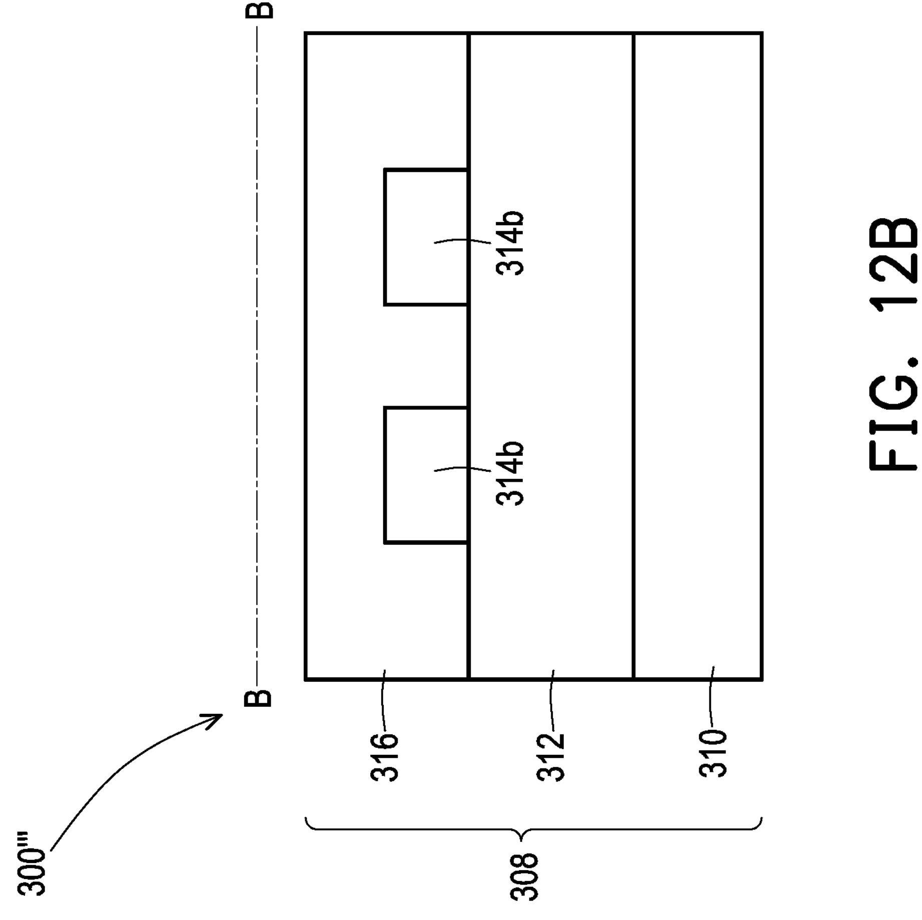

Referring now to FIGS. 12A and 12B illustrated is an embodiment of an MZI denoted MZI 300'''. The MZI component 300''' may be substantially similar to the MZI 300' discussed above with reference to FIGS. 5A, 5B, 5C. The MZI component 300''' similarly includes a first arm 306 (cross-section illustrated in FIG. 12A) and a second arm 308 (cross-section illustrated in FIG. 12B) opposing the first arm 306; that is, FIG. 12A illustrates a cross-section corresponding to A-A' of FIG. 5A and FIG. 12B illustrates a cross-section corresponding to B-B' of FIG. 5A. Similar to as discussed above with reference to FIGS. 5A, 5B, 5C, the MZI component 300''' includes the substrate 310 and a lower cladding layer 312. However, the MZI component 300''' includes an upper cladding layer 316 having the same composition in the first arm 306 and the second arm 308. The TOC compensation region 320 is provided in the MZI 300''' by the core layer of the waveguide being comprised of different material between the two arms 306, 308 of the MZI 300'''. In an embodiment, a core 314*t'* provides the core layer in a first arm 306 and the core 314*b* provides the core layer in a second arm 308. The core 314*t'* is a first material and a core 314*b* is a second material, different than the first material. In an embodiment, the material of the core 314*t'* is a negative TOC material. In a further embodiment, the material of core 314*b* is a material having a higher TOC.

In an embodiment of the MZI 300''', the lower cladding layer 312 is silicon oxide and the upper cladding layer 316 is also silicon oxide. In an embodiment, the waveguide core 314*b* at the arm 308 is silicon. In some implementations, the waveguide core 314*b* is a SWG configuration. In an embodiment, the waveguide core 314*t'* of the arm 306 is a negative TOC material. In a further embodiment, the waveguide core 314*t'* is a sputter deposited, amorphous $TiO_2$. The negative TOC material of the waveguide core 314*t'* may be substantially similar to as discussed above with reference to the negative TOC material used as an upper cladding. In an embodiment, the formation of the waveguide core 314*t'* as a negative TOC material reduces a thermal effect of the device compared to use of a higher TOC material such as silicon.

Although not intended to be limiting, one or more embodiments of the present disclosure provide many benefits to optical communication systems. In optical communication system field, the exemplary optical structures provide wavelength filtering with high quality factors. The embodiments described herein are exemplary only and other structures may also benefit from aspects of the present disclosure. That is various devices including the MZI including devices discussed above, can provide for cancellation of the effective index change to the waveguide width variation on a MZI, while remaining the same optical phase difference.

In an example aspect, the present disclosure is directed to an optical device. The optical device includes a first optical path including a first waveguide core and a first cladding layer adjacent the first waveguide core; and a second optical path including a second waveguide core and a second cladding layer adjacent the second waveguide core. A thermo-optic coefficient (TOC) of the first waveguide core and a TOC of the first cladding layer have a same sign, and a sign of a TOC of the second waveguide core is different than a sign of a TOC of the second cladding layer.

In a further embodiment, the sign of the TOC of the second waveguide core is positive and the sign of the TOC of the second cladding layer is negative. In an implementation, the sign of the TOC of the first waveguide core is positive and the TOC of the first cladding layer is positive. In an embodiment, the second cladding layer is disposed over the second waveguide core and wherein the second cladding layer includes a negative thermo-optic coefficient (TOC) material. In some implementations, the negative TOC material is amorphous titanium dioxide ($TiO_2$). In an embodiment, the first cladding layer is disposed over the first waveguide core and the sign of the TOC of the first cladding layer and the first waveguide core are both positive.

In an embodiment of the optical device, the second cladding layer is disposed over the second waveguide core and the second waveguide core includes a negative thermo-optic coefficient (TOC) material. In some implementations, the first waveguide core is silicon. In the optical device, the first optical path may be a first arm of a Mach-Zehnder Interferometer (MZI) and the second optical path is a second arm of the MZI—the second arm may be opposing the first arm.

In another example aspect, the present disclosure is directed to an optical device. The optical device includes a first optical path including a first waveguide core of a first material and a first cladding layer of a second material adjacent the first waveguide core and a second optical path including a second waveguide core of the first material and a second cladding layer of a third material. The second cladding layer may be adjacent the second waveguide core. The second material and the third material are different (e.g., compositions). For example, the third material may be amorphous titanium dioxide ($TiO_2$) and the second material being another dielectric.

In some implementations, the second material is silicon dioxide. The amorphous TiO2 may be a negative thermo-optic coefficient (TOC) material. In an embodiment, the second material is disposed below the third material and below second waveguide core in the second optical path. For example, the second material may be disposed below the first waveguide core in the first optical path.

In an embodiment, the first material of the example optical device is silicon. A first cladding layer may be disposed over the first waveguide core and the second cladding layer may be disposed over the second waveguide core. In some implementations, first optical path is a first arm of a Mach-Zehnder Interferometer (MZI) and the second optical path is a second arm of the MZI, the second arm opposing the first arm. The first arm may be longer than the second arm of the MZI.

In yet another example embodiment, an optical device includes an input region and an output region and a Mach-Zehnder Interferometer (MZI) between the input region and the output region. The MZI includes a first arm having a first waveguide comprising a lower cladding layer, a core layer, and an upper cladding layer and a second arm having a second waveguide comprising a lower cladding layer, a core layer, and an upper cladding layer. The upper cladding layer of the first arm comprises a first material and the upper cladding layer of the second arm comprises a second material different than the first material.

In some implementations, the first material is silicon oxide. And in an embodiment, the second material is titanium oxide. In an embodiment, the second material is a negative TOC and the first material has a positive TOC.

In some implementations, the second material is disposed over a first leg of the first arm and the first material is disposed over a second leg of the first arm. In an embodiment, a length of the second arm (e.g., optical length) is greater than a length (e.g., optical length) of the first arm. And a width of the second arm may be greater than a width of the first arm. In a further embodiment, the second arm includes a negative TOC material.

In another of the broader embodiments, a method is provided. The method includes depositing a lower cladding layer on a substrate and providing a waveguide core layer on the lower cladding layer. A first upper cladding layer is deposited on a first region of the waveguide core layer. After depositing the first upper cladding layer, a second upper cladding layer is deposited on a second region of the waveguide core layer. The second upper cladding layer is different than the first upper cladding layer.

In a further embodiment of the method, at least one of the depositing the first upper cladding layer or depositing the second upper cladding layer includes a sputter deposition process. The sputter deposition process may form amorphous titanium dioxide in some implementations.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical device comprising:

a first optical path including a first waveguide core of a first material and a first cladding layer of a second material adjacent and over the first waveguide core, wherein the first optical path includes a first arm having a first leg of the first waveguide core and a second leg of the first waveguide core, wherein the first cladding layer of the second material covers a top surface and an entirety of each sidewall of the first leg, the first cladding layer of the second material covers a top surface and an entirety of each sidewall of the second leg, the first cladding layer extending fills a distance between the first leg to the second leg in a first cross-sectional view; and a second optical path including a second waveguide core of the first material and a second cladding layer of a third material, the second cladding layer adjacent and over the second waveguide core, wherein the second material and the third material are different, the third material being amorphous titanium dioxide ($TiO_2$) and the second material being another dielectric, and wherein the second optical path includes a second arm having a third leg of the second waveguide core and a fourth leg of the second waveguide core, wherein the second cladding layer of the third material fills a distance between the third leg to the fourth leg in a second cross-sectional view, the third material covering a top surface and an entirety of each sidewall of the third leg and the fourth leg, and the first cross-sectional view being parallel to the second cross-sectional view.

2. The optical device of claim 1, wherein the second material is silicon dioxide.

3. The optical device of claim 1, wherein the second material is disposed below the third material and second waveguide core in the second optical path.

4. The optical device of claim 3, wherein the second material is disposed below the first waveguide core in the first optical path.

5. The optical device of claim 1, wherein the first material is silicon.

6. The optical device of claim 1, wherein the first arm is of a Mach-Zehnder Interferometer (MZI) and the second arm is of the MZI, the second arm opposing the first arm such that in a top view the first arm and the second arm are symmetric opposing arms.

7. The optical device of claim 1, wherein the first leg and the third leg are substantially aligned along a direction perpendicular to the first cross-sectional view and the second leg and the fourth leg are aligned along the direction.

8. An optical device, comprising:

an input region and an output region;

a Mach-Zehnder Interferometer (MZI) between the input region and the output region, wherein the MZI includes:

a first arm having a first waveguide comprising a lower cladding layer, a core layer, and an upper cladding layer, wherein the upper cladding layer comprises a first material, wherein the first material of the upper cladding layer is disposed on the core layer and extends along an extent of a sidewall of the core layer from a top surface of the core layer to the lower cladding layer; and a second arm having a second waveguide comprising a lower cladding layer, a core layer, and an upper cladding layer wherein the upper cladding layer comprises a second material different than the first material, wherein the second material of the upper cladding layer is disposed on the core layer and extends along an extent of a sidewall of the core layer from a top surface of the core layer to the lower cladding layer; and wherein the first arm is opposing and symmetrical to the second arm in the MZI and wherein the first arm and the second arm each include a gap within the core layer, the second material of the upper cladding layer entirely filling the gap.

9. The optical device of claim 8, wherein the first material is silicon oxide.

10. The optical device of claim 9, wherein the second material is titanium oxide.

11. The optical device of claim 8, wherein the second material is a negative TOC and the first material has a positive TOC.

12. The optical device of claim 8, wherein the second material is disposed over a first leg of the first arm and the first material is disposed over a second leg of the first arm, the second material extending from an interface with the sidewall of the core layer of the first leg to an interface with another sidewall of the core layer of the second leg.

13. The optical device of claim 8, further comprising:

a third arm adjacent and coupled to the first arm, wherein a length of the third arm is greater than a length of the first arm.

14. The optical device of claim 13, further comprising:

a fourth arm adjacent the second arm and opposing and symmetrical to the third arm.

15. The optical device of claim 14, wherein the second arm and the fourth arm include a negative TOC material interfacing a silicon core layer.

16. A device, comprising:

a lower cladding layer on a substrate;

a first arm comprising a first leg and a second leg each having a first waveguide core layer on the lower cladding layer;

a second arm opposing the first arm, wherein the second arm includes a third leg and a fourth leg each having a second waveguide core layer on the lower cladding layer;

a first upper cladding layer; and a second upper cladding layer; wherein the first upper cladding layer is disposed on a first region of the first leg of the first waveguide core layer, wherein the first region of the first waveguide core layer includes a first segment and a second segment, a first distance extending between a first sidewall of the second segment and a second sidewall of the first segment in a first cross-sectional view, wherein the first upper cladding layer is disposed within the first distance; and the second upper cladding layer on a second region of the second leg of the first waveguide core layer, wherein the second upper cladding layer is different than the first upper cladding layer, wherein the second region of the second leg of the first waveguide core layer includes a third segment and a fourth segment, a second distance extending between a first sidewall of the third segment and a second sidewall of the fourth segment in a second cross-sectional view, wherein the second upper cladding layer is disposed within the second distance; and wherein the second upper cladding layer covers the third leg of the second waveguide core layer and covers the fourth leg of the second waveguide core layer.

17. The device of claim 16, wherein the first upper cladding layer includes amorphous titanium dioxide.

18. The device of claim 17, wherein the second upper cladding layer includes silicon oxide.

19. The device of claim 16, wherein the first upper cladding layer is a negative TOC and the second upper cladding layer has a positive TOC.

20. The device of claim 16, further comprising a bottom cladding layer below the first upper cladding layer and the second upper cladding layer.

* * * * *